US011924608B2

(12) United States Patent
Zhou et al.

(10) Patent No.: US 11,924,608 B2
(45) Date of Patent: Mar. 5, 2024

(54) MICROPHONE

(71) Applicant: SHENZHEN SHOKZ CO., LTD., Guangdong (CN)

(72) Inventors: Wenbing Zhou, Shenzhen (CN); Yongshuai Yuan, Shenzhen (CN); Wenjun Deng, Shenzhen (CN); Yujia Huang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/816,013

(22) Filed: Jul. 29, 2022

(65) Prior Publication Data

US 2023/0049593 A1 Feb. 16, 2023

Related U.S. Application Data

(63) Continuation of application No. PCT/CN2021/112016, filed on Aug. 11, 2021.

(51) Int. Cl.

*H04R 1/46* (2006.01)
*H04R 17/02* (2006.01)
*H04R 17/10* (2006.01)

(52) U.S. Cl.

CPC ............ *H04R 1/46* (2013.01); *H04R 17/025* (2013.01); *H04R 17/10* (2013.01)

(58) Field of Classification Search

CPC ......... H04R 1/46; H04R 17/025; H04R 17/10
See application file for complete search history.

(56) References Cited

U.S. PATENT DOCUMENTS

| | | | | |
|---|---|---|---|---|
| 4,885,781 | A | 12/1989 | Seidel | |
| 11,039,262 | B2 | 6/2021 | Kim et al. | |
| 2005/0193822 | A1 * | 9/2005 | Amano | G06V 40/1306 73/704 |
| 2007/0253570 | A1 | 11/2007 | Fukumoto et al. | |

(Continued)

FOREIGN PATENT DOCUMENTS

| | | | |
|---|---|---|---|
| CA | 3126285 | A1 | 7/2020 |
| CN | 1119917 | C | 8/2003 |

(Continued)

OTHER PUBLICATIONS

International Search Report in PCT/CN2021/112016 dated Apr. 25, 2022, 10 pages.

(Continued)

*Primary Examiner* — Mark Fischer
(74) *Attorney, Agent, or Firm* — METIS IP LLC

(57) ABSTRACT

The present disclosure provides a microphone, comprising a shell structure, a vibration pickup assembly, a vibration pickup assembly, wherein the vibration pickup assembly is accommodated in the shell structure and generates vibration in response to an external sound signal transmitted to the shell structure, and at least two acoustoelectric conversion elements configured to respectively receive the vibration of the vibration pickup assembly to generate an electrical signal, wherein the at least two acoustoelectric conversion elements have different frequency responses to the vibration of the vibration pickup assembly.

20 Claims, 22 Drawing Sheets

500

(56) References Cited

U.S. PATENT DOCUMENTS

| | | | |
|---|---|---|---|
| 2009/0140612 A1 | 6/2009 | Ikeuchi | |
| 2016/0050506 A1 | 2/2016 | Kim | |
| 2017/0006385 A1 | 1/2017 | Kim | |
| 2020/0212885 A1 | 7/2020 | Kim et al. | |
| 2020/0213774 A1 | 7/2020 | Meng et al. | |
| 2021/0210087 A1 | 7/2021 | Kim et al. | |
| 2021/0321207 A1* | 10/2021 | Lomas ................. | H10N 30/304 |
| 2022/0286772 A1 | 9/2022 | Zhou et al. | |

FOREIGN PATENT DOCUMENTS

| | | |
|---|---|---|
| CN | 112601169 A | 4/2021 |
| EP | 1909079 A1 | 4/2008 |
| JP | H09163477 A | 6/1997 |
| JP | H11113079 A | 4/1999 |
| WO | 2020142812 A1 | 7/2020 |

OTHER PUBLICATIONS

Written Opinion in PCT/CN2021/112016 dated Apr. 25, 2022, 7 pages.

The Extended European Search Report in European Application No. 21921644.7 dated Mar. 29, 2023, 9 pages.

First Office Action in Russian Application No. 2022121653 dated Mar. 7, 2023, 26 pages.

Decision of Grant in Russian Application No. 2022121653 dated Jun. 20, 2023, 20 pages.

Notice of Reasons for Rejection in Japanese Application No. 2022560091 dated Oct. 30, 2023, 9 pages.

* cited by examiner

200

800

1100

1500

MICROPHONE

CROSS-REFERENCE TO RELATED APPLICATIONS

This application is a Continuation of International Application No. PCT/CN2021/112016, filed on Aug. 11, 2021, the contents of each of which are hereby incorporated by reference.

TECHNICAL FIELD

The present disclosure relates to an acoustic transmission technology field, in particular, relates to a microphone.

BACKGROUND

A Microphone (e.g., a bone conduction microphone or an air conduction microphone) may output a full-band signal based on an external sound signal. The full-band signal output by the microphone may be processed in subsequent voice recognition, noise reduction, signal enhancement, and other signal processing after being processed through a sub-band frequency division processing (further be known as a sub-band decomposition processing). The sub-band frequency division processing technology may be widely used in fields of electroacoustic, communication, image coding, echo cancellation, radar binning, etc. The current sub-band frequency division processing technology usually utilizes hardware circuits (e.g., an electronic element) and software algorithms (e.g., digital technology) to perform the sub-band frequency division processing on the full-band signal. On one hand, since the electronic element is affected by its characteristics, the better the performance of a filter, the more complex the circuit design. On the other hand, the use of the software algorithms for the sub-band frequency division processing of full-band signal requires a relatively high computing resources and may further cause sound signal distortion and noise introduction during processing, which may affect the sound quality.

Therefore, it is desired to provide a microphone that may simplify a process of sub-band frequency division of the full-band signal, implement sub-bands from the device side, reduce the dependence on complex hardware circuits and software algorithms, and further improve the quality of the final sound signal.

SUMMARY

A microphone, comprising: a shell structure; a vibration pickup assembly, wherein the vibration pickup assembly may be accommodated in the shell structure and generates vibration in response to an external sound signal transmitted to the shell structure; and at least two acoustoelectric conversion elements may be configured to respectively receive the vibration of the vibration pickup assembly to generate an electrical signal, wherein, the at least two acoustoelectric conversion elements may have different frequency responses to the vibration of the vibration pickup assembly.

In some embodiments, wherein a frequency response corresponding to each acoustoelectric conversion element may include at least one resonant frequency, at least two of a plurality of resonant frequencies corresponding to the at least two acoustoelectric conversion elements may be within a range of 20 Hz-16000 Hz.

In some embodiments, wherein a count of sub-bands corresponding to the at least two acoustoelectric conversion elements may be no less than 5.

In some embodiments, wherein the vibration pickup assembly and the shell structure may define at least one acoustic cavity, the at least one acoustic cavity may include a first acoustic cavity; the shell structure may include at least one hole, the at least one hole may be located at the first acoustic cavity, and the at least one hole may guide the external sound signal into the first acoustic cavity, wherein the vibration pickup assembly may vibrate in response to a sound signal in the first acoustic cavity, and the at least two acoustoelectric conversion elements may respectively receive the vibration of the vibration pickup assembly to generate the electrical signal.

In some embodiments, wherein the vibration pickup assembly may be connected with the shell structure through the peripheral side of the vibration pickup assembly, wherein at least the partial structure of the vibration pickup assembly may generate vibration in response to the external sound signal.

In some embodiments, wherein the vibration pickup assembly may include a first vibration pickup assembly, and at least two acoustoelectric conversion elements may be connected with the first vibration pickup assembly, directly or indirectly.

In some embodiments, wherein the vibration pickup assembly may include a first vibration pickup assembly and a second vibration pickup assembly sequentially arranged from top to bottom, and the first vibration pickup assembly and the second vibration may be connected with the shell structure through a peripheral side, wherein at least partial structure of the first vibration pickup assembly and the second vibration pickup assembly may generate vibration in responses to the external sound signal.

In some embodiments, wherein a vibration transmission assembly in a tubular structure may be arranged between the first vibration pickup assembly and the second vibration pickup assembly, wherein the vibration transmission assembly, the first vibration pickup assembly, and the second vibration pickup assembly may define a cavity.

In some embodiments, wherein the vibration pickup assembly may include a first vibration pickup assembly, the second vibration pickup assembly and a third vibration pickup assembly, the first vibration pickup assembly and the second vibration pickup assembly may be set opposite each other, a vibration transmission assembly in a tubular structure may be arranged between the first vibration pickup assembly and the second vibration pickup assembly, the vibration transmission assembly, the first vibration pickup assembly, and the second vibration pickup assembly may define a cavity; the third vibration pickup assembly may be connected between the vibration transmission assembly and an inner wall of the shell structure, wherein the third vibration pickup assembly may generate vibration in response to the external sound signal.

In some embodiments, wherein each acoustoelectric conversion element may include a cantilever beam structure, one end of the cantilever beam structure may be connected with the inner wall of the vibration transmission assembly and another end of the cantilever beam structure may be suspended in the cavity, wherein the cantilever beam structure may be deformed based on the vibration signal to convert the vibration signal into the electrical signal.

In some embodiments, wherein different cantilever beam structures may be distributed at intervals at the inner wall of the vibration transmission assembly.

In some embodiments, wherein the size or material of the cantilever beam corresponding to at least two acoustoelectric conversion elements may be different.

In some embodiments, wherein the at least two acoustoelectric conversion elements may include a first cantilever beam structure and a second cantilever beam structure, a length of the first cantilever beam in a direction perpendicular to a vibration direction of the first cantilever beam may be greater than a length of the second cantilever beam in a direction perpendicular to a vibration direction of the second cantilever beam, and a resonant frequency corresponding to the first cantilever beam may be lower than a resonant frequency corresponding to the second cantilever beam.

In some embodiments, wherein the cantilever beam structure may include a first electrode layer, a piezoelectric layer, a second electrode layer, an elastic layer, and a substrate layer, wherein the first electrode layer, the piezoelectric layer, and the second electrode layer may be sequentially arranged, the elastic layer may be located on an upper surface of the first electrode layer or a lower surface of the second electrode layer, and the substrate layer may be located on an upper surface or lower surface of the elastic layer.

In the embodiments, wherein the cantilever beam structure may include at least one elastic layer, an electrode layer, and a piezoelectric layer, wherein the at least one elastic layer may be located on a surface of the electrode layer; the electrode layer may include a first electrode and a second electrode, wherein the first electrode may be bent into a first comb-like structure, the second electrode may be bent into a second comb-like structure, the first comb-like structure may cooperate with the second comb-like structure to form the electrode layer may be located on an upper surface or a lower surface of the piezoelectric layer; the first comb-like structure and the second comb-like structure may extend along a length of the cantilever beam structure.

In some embodiments, wherein each acoustoelectric conversion element may include a first cantilever beam structure and a second cantilever beam structure, the first cantilever beam structure may be arranged opposite to the second cantilever beam structure, and the first cantilever beam structure and the second cantilever beam structure may have a first distance, wherein the first distance between the first cantilever beam structure and the second cantilever beam structure may change based on a vibration signal to convert the vibration signal into an electrical signal.

In some embodiments, wherein the first cantilever beam structure and the second cantilever beam structure corresponding to each acoustoelectric conversion element may be distributed at intervals at an inner wall of a peripheral side of the vibration transmission assembly.

In some embodiments, wherein a stiffness of the first cantilever beam structure may be different from a stiffness of the second cantilever beam structure.

In some embodiments, wherein the microphone may include at least one membrane structure, wherein the at least one membrane structure may be located on an upper surface and/or a lower surface of the acoustoelectric conversion elements.

In some embodiments, at least one membrane structure may cover the upper and/or lower surface of the acoustoelectric conversion elements may fully or partially.

In some embodiments, wherein the microphone may include at least one supporting structure, one end of the at least one supporting structure may be connected with a first vibration pickup assembly of the vibration pickup assembly, and another end of the at least one supporting structure may be connected with a second vibration pickup assembly of the vibration pickup assembly, and a free end of the at least two acoustoelectric conversion elements and the supporting structure may have a second distance.

In some embodiments, wherein the microphone may further include at least one sampling module configured to convert electrical signals output by different acoustoelectric conversion elements into digital signals, wherein the sampling module may use different sampling frequencies to sample the electrical signals output by different acoustoelectric conversion elements.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

FIG. 0.7B is a schematic diagram illustrating a cantilever beam structure according to some embodiments of the present disclosure;

DETAILED DESCRIPTION

Figure 1:
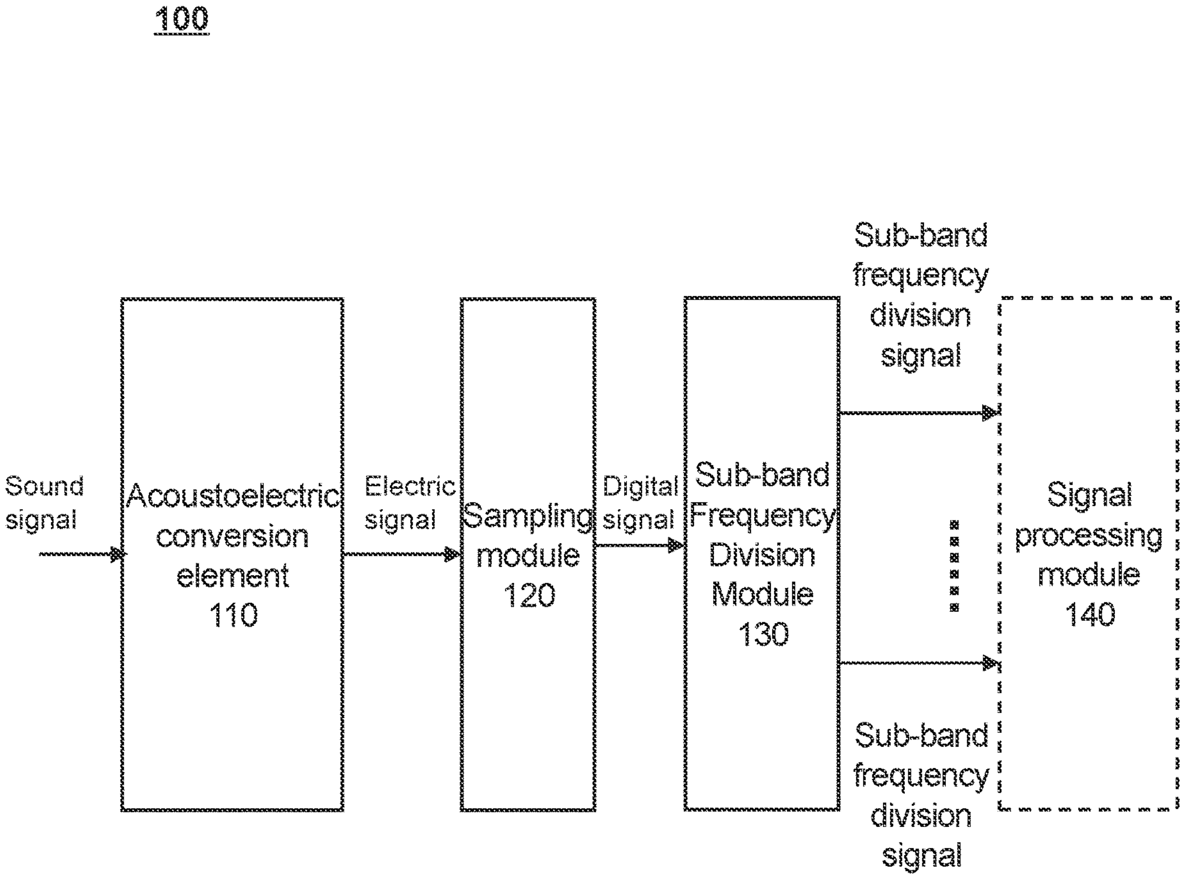
FIG. 1 is a flow diagram illustrating an exemplary process of performing a sub-band frequency division according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections or assemblies of different levels in ascending order. However, if other words may achieve the same purpose, the words may be replaced by other expressions.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements may not constitute an exclusive list, and the method or device may further include other steps or elements.

The flowcharts used in the present disclosure illustrate operations that the system implements according to the embodiment of the present disclosure. It should be understood that a previous operation or a subsequent operation of the flowcharts may not be accurately implemented in order. Instead, a plurality of steps may be processed in reverse or simultaneously. Moreover, other operations may further be added to these procedures, or one or more steps may be removed from these procedures.

The present disclosure describes a microphone. The microphone may be a transducer that may convert a sound signal into an electrical signal. In some embodiments, a microphone may be a moving coil microphone, a ribbon microphone, a condenser microphone, a piezoelectric microphone, an electret microphone, an electromagnetic microphone, a carbon microphone, or any combination thereof. In some embodiments, distinguished by way of sound acquisition, the microphone may include a bone conduction microphone and an air conduction microphone. The microphone described in this embodiment of the present disclosure may include a shell structure, a vibration pickup assembly, and at least two acoustoelectric conversion elements. The shell structure may be configured to carry the vibration pickup assembly and the at least two acoustoelectric conversion elements. In some embodiments, the shell structure may have a cuboid, a cylinder, or other irregular structure. In some embodiments, the shell structure may be a structure with hollow interior, independently forming an acoustic cavity, and the vibration pickup assembly and the at least two acoustoelectric conversion elements may be located within the acoustic cavity. In some embodiments, the vibration pickup assembly may be connected with a side wall of the shell structure, and the vibration pickup assembly may generate vibration in response to an external sound signal transmitted to the shell structure. In some embodiments, the at least two acoustoelectric conversion elements may be connected with the vibration pickup assembly directly or indirectly, to receive the vibration of the vibration pickup assembly and convert the received vibration signal to an electrical signal for output.

In some embodiments, different acoustoelectric conversion elements (e.g., a cantilever beam structure) may have different frequency responses to the vibration of the vibration pickup assembly. For example, each acoustoelectric conversion element has a resonance frequency and a high response to a sound near the resonance frequency. In some embodiments, the response of each acoustoelectric conversion element to the sound signal or the vibration signal may be described through a corresponding frequency response curve (e.g., frequency response curves 920, 930 shown in FIG. 9). In some embodiments, through arranging a structure, size, and material of each acoustoelectric conversion element, and etc. (e.g., the cantilever beam structure), different acoustoelectric conversion elements having different frequency widths and different resonant frequencies of frequency response, respectively, may be realized. For example, by setting cantilever beam structures of different lengths, the resonant frequencies of cantilever beam structures of different lengths may be within frequency ranges of 300 Hz-500 Hz, 500 Hz-700 Hz, 700 Hz-1000 Hz, 2200 Hz-3000 Hz, 4700 Hz-5700 Hz, 7000 Hz-12000 Hz, and etc., respectively. In some embodiments, each acoustoelectric conversion elements may maintain a high sensitivity only near resonance peaks, i.e., a sensitivity of the acoustoelectric conversion element at the resonance peaks may be much greater than a sensitivity of other regions (especially a region whose frequencies is far away from the resonance peak), thus the sub-band frequency division of the sound signal may be implemented through using a plurality of acoustoelectric conversion elements to perform an acoustoelectric conversion of the sound signal near the respective resonance peaks of the acoustoelectric conversion elements. In some embodiments, a difference between resonant frequencies of at least two of the different acoustoelectric conversion elements may be greater than 5000 Hz. In some embodiments, the difference between resonant frequencies of at least two of the different acoustoelectric conversion elements may be greater than 3000 Hz. In some embodiments, the difference between resonant frequencies of at least two of the different acoustoelectric conversion elements may be greater than 2000 Hz. In some embodiments, the difference between resonant frequencies of at least two of the different acoustoelectric conversion elements may be greater than 1000 Hz. In some embodiments, the difference between resonant frequencies of at least two of the different acoustoelectric conversion elements may be greater than 500 Hz. In some embodiments, the difference between resonant frequencies of at least two of the different acoustoelectric conversion elements may be greater than 200 Hz. In some embodiments, the difference between resonant frequencies of at least two of the different acoustoelectric conversion elements may be greater than 100 Hz. For ease of description of this content, and as an exemplary illustration only, a microphone may include 100 sub-bands within a range of 20 Hz-15000 Hz, wherein each sub-band has a bandwidth of about 150 Hz, a frequency band range of a minimum resonance frequency may be within a range of 20 Hz-170 Hz, a frequency band of a maximum resonance frequency may be within a range of 14850 Hz-15000 Hz, and a difference between the maximum resonance frequency (e.g., about 14920 Hz) and the minimum resonance frequency (e.g., about 95 Hz) may be about 14825 Hz. As another example, within a range of 20 Hz-10000 Hz, the microphone may include 40 sub-bands, wherein each sub-band has a bandwidth of 250 Hz, the frequency band range of the minimum resonance frequency may be within a range of 20 Hz-270 Hz, the frequency band of the maximum resonance frequency may be within a range of 9750 Hz-10000 Hz, and the difference between the maximum resonance frequency (e.g., about 14920 Hz) and the minimum resonance frequency (e.g., about 95 Hz) may be about 9730 Hz. As further an example, within a range of 20 Hz-10000 Hz, the microphone may include 10 sub-bands, wherein each sub-band has a bandwidth of 1000 Hz, the frequency band range of the minimum resonance frequency may be within a range of 20 Hz-1020 Hz, the frequency band of the maximum resonance frequency may be within a range of 9000 Hz-10000 Hz, and the difference between the maximum resonance frequency (e.g., about 9500 Hz) and the minimum resonance frequency (e.g., about 510 Hz) may be about 9730 Hz. It should be noted that the above is only an exemplary illustration, and the specific values of the selected band range, number of sub-bands, and bandwidth width may be adapted according to different application scenarios (e.g., an indoor call scenario, an outdoor noise scenario, etc.), and may not be further limited. The frequency response of the microphone may be regarded as a flatter frequency response curve with a higher signal-to-noise ratio formed through a fusion of the frequency responses of different acoustoelectric conversion elements (e.g., a frequency response curve 910 shown in FIG. 9). On one hand, the microphone provided by the embodiment of the present disclosure may perform a sub-band frequency division processing to the full-band signal through the structure of the microphone without using hardware circuits (e.g., filtering circuits) or software algorithms, which may avoid problems of complex hardware circuit design, relatively high computing resources of the software algorithms, signal distortion, and noise introduction, thus reducing the complexity and production cost of the microphone. On the other hand, the microphone provided by the embodiments of the present disclosure may output a flatter frequency response curve with a relatively high signal-to-noise ratio to improve the signal quality of the microphone. Moreover, by setting different acoustoelectric conversion elements (e.g., the cantilever beam structure), resonance peaks of different frequency ranges may be added to the microphone system, which improves a sensitivity of the microphone near a plurality of resonance peaks, thus improving the sensitivity of the microphone over the whole broadband.

FIG. 1 is an exemplary flowchart of a process of performing sub-band frequency division according to some embodiments of the present disclosure. As shown in FIG. 1, in some embodiments, a microphone 100 may include an acoustoelectric conversion element 110, a sampling module 120, a sub-band frequency division module 130, and a signal processing module 140.

The microphone 100 may be a transducer that may convert a sound signal into an electrical signal. In some embodiments, the microphone 100 may be a moving coil microphone, a ribbon microphone, a condenser microphone, a piezoelectric microphone, an electret microphone, an electromagnetic microphone, a carbon microphone, etc., or any combination thereof. In some embodiments, distinguished by way of sound acquisition, a microphone 100 may include a bone conduction microphone and an air conduction microphone.

An acoustoelectric conversion element 110 is configured to receive the vibration to generate an electrical signal. Taking the bone conduction microphone as an example, in some embodiments, the microphone 110 may further include a shell structure, a vibration pickup assembly, wherein the vibration pickup assembly may be accommodated in the shell structure and may generate vibration in response to an external sound signal transmitted to the shell structure. Taking the air conduction microphone as an example, in some embodiments, the vibration pickup assembly and the shell structure may define at least one acoustic cavity, the at least one acoustic cavity may include a first acoustic cavity, the shell structure may include one or more holes, the one or more holes may be located on the first acoustic cavity, and the one or more holes may guide the external sound signal into the first acoustic cavity, wherein the vibration pickup assembly may generate the vibration in response to a sound signal transmitted to the shell structure and further entering in the first acoustic cavity, and the acoustoelectric conversion element 110 may receive the vibration of the vibration pickup assembly to generate the electrical signal.

In some embodiments, the acoustoelectric conversion element 110 may convert a sound signal into an electric signal. In some embodiments, the acoustoelectric conversion element 110 may include a condenser acoustoelectric conversion element or a piezoelectric element. In some embodiments, the piezoelectric conversion element may be an element that may convert a change of measured non-electric quantity (e.g., a pressure, a displacement, etc.) into a change of voltage. For example, the piezoelectric conversion element may include a cantilever beam structure that may be deformed under the vibration of the vibration pickup assembly, and a piezoelectric effect caused by the deformed cantilever structure may produce an electrical signal. In some embodiments, a condenser acoustoelectric conversion element may be an element that may convert the change of measured non-electric quantity (e.g., a displacement, a pressure, a light intensity, an acceleration, etc.) into a change of capacitance. For example, a condenser acoustoelectric conversion element may include a first cantilever beam structure and a second cantilever beam structure, and the first cantilever beam structure and the second cantilever beam structure may be deformed to different degrees through the vibration of the vibration pickup assembly, thereby a distance between the first cantilever beam structure and the second cantilever beam structure may change. The distance between the first cantilever beam structure and the second cantilever beam structure may be converted into the change of capacitance to realize a conversion from the vibration signal to the electrical signal. More information about the specific structure of the acoustoelectric conversion element 110 may be referred to FIG. 5, FIG. 8, and related descriptions.

The sampling module 120 may sample (and maintain), quantize, and encode the electrical signal based on a sampling frequency to convert an electrical signal into a digital signal. In some embodiments, the sampling module 120 may include a sampling circuit, an analog-to-digital converter, etc. Specifically, the sampling circuit may discretize a continuous electrical signal input to the sampling module 120, i.e., the continuous electrical signal may be sampled based on the sampling frequency to obtain a series of discrete sampled values (i.e., sampled signals).

The sub-band frequency division module 130 may decompose a digital signal into a plurality of sub-band frequency division signals. In some embodiments, the sub-band frequency division module 130 may include an electronic element (e.g., a filter, a frequency division module). In some embodiments, the filter may select an electrical signal within a specific frequency range and attenuate the electrical signal within other frequency ranges according to the frequency characteristics. The frequency characteristics of the filter may be achieved by adjusting parameters of a resistor, a capacitor, an inductor, and other elements in the filter circuit. In some embodiments, the sub-band frequency division module 130 may include a plurality of filters with different frequency characteristics, which may separately generate resonance in the resonance frequency range, and respectively select the electrical signal in the corresponding resonance frequency range to decompose a wideband electrical signal into a plurality of sub-band frequency division signals. In some embodiments, the signal may further be performed according to a sub-band frequency division processing through a back-end algorithm. In some embodiments, the back-end algorithm may include but is not limited to, one or more Linear Predictive Coding (LPC), Linear Predictive Cepstral Coefficients (LPCC), Mel-Frequency Cepstral Coefficients (MFCC), etc.

The signal processing module 140 may process the sub-band frequency division signal. In some embodiments, the signal processing module 140 may include one or more equalizer, a dynamic range controller, a phase processor, etc. In some embodiments, the equalizer may be configured to gain and/or attenuate the sub-band frequency division signal output by the sub-band frequency division module 130 according to a specific frequency band (e.g., a frequency band corresponding to the sub-band frequency division signal). The gain of the sub-band frequency division signal may refer to increase the signal amplification; attenuating the sub-band frequency division signal may refer to decrease the signal amplification. In some embodiments, a dynamic range controller may be configured to compress and/or amplify the sub-band frequency division signal. The compressing and/or amplifying the sub-band frequency division electrical signal may refer to reducing and/or increasing a ratio between the input signal and the output signal in the microphone 100. In some embodiments, the phase processor may be configured to adjust a phase of the sub-band frequency division signal. In some embodiments, the signal processing module 140 may be located inside the microphone 100. For example, the signal processing module 140 may be located in the acoustic cavity formed independently by the shell structure of the microphone 100. In some embodiments, the signal processing module 140 may further be located in other electronic devices, for example, any one of headphone, a mobile device, a tablet, a laptop, etc., or any combination thereof. In some embodiments, the smart home device may include a control device for a smart appliance, a smart monitoring device, a smart TV, a smart camera, etc., or any combination thereof. In some embodiments, the smart mobile device may include a smartphone, personal digital assistant (PDA), game device, navigation device, POS device, etc., or any combination thereof.

In the working process of the microphone 100 mentioned above, on one hand, when the sub-band frequency division module 130 is an electronic element, a design of the filter circuit of sub-band frequency division module 130 may be usually more complex to achieve a better effect of frequency wave filtering due to influence of the electronic element characteristics. On the other hand, the sub-band frequency division module 140 may realize the sub-band frequency division through the back-end algorithm, which requires a relatively high computing resources of the back-end algorithm and a large amount of data to be processed, resulting in the calculation time being too long, further, the implementation of sub-band frequency division through the back-end algorithm may cause the distortion of the sound signal and the noise introduction during processing, which may affect the sound quality. Therefore, to solve the problems existing in the above manner of the sub-band frequency division, the present disclosure may provide a microphone to solve the problems of a complex filter circuit design and a large amount of calculation of the back-end algorithm in the microphone, meanwhile to improve a Q value and a sensitivity of the microphone. More information about the microphone may be referred to FIG. 2-FIG. 20 and related description.

It should be noted that components of the microphone 100 may be not limited to the acoustoelectric conversion element 110, the sampling module 120, the sub-band frequency division module 130, and the signal processing module 140 shown in FIG. 1, but may further include other modules. Moreover, the acoustoelectric conversion element 110, the sampling module 120, the sub-band frequency division module 130, and the signal processing module 140 may be used as a system, and the microphone 100, as a part of the system, may include only the acoustoelectric conversion element 110. The sampling module 120, the sub-band frequency division module 130, and the signal processing module 140 may be set outside the microphone 100, and the electrical signal output by the acoustoelectric conversion element 110 may be transmitted to a corresponding module for subsequent processing through the way of wired or wireless.

Figure 2:
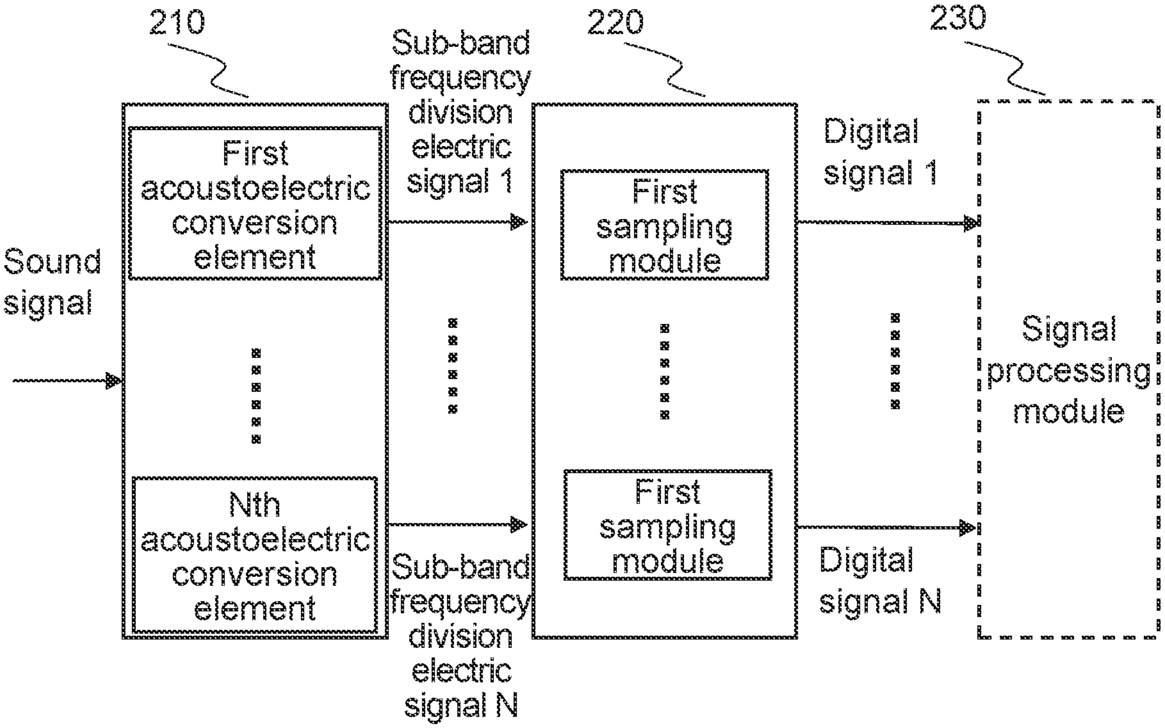
FIG. 2 is a flow diagram illustrating an exemplary process of performing a sub-band frequency division according to some embodiments of the present disclosure.

FIG. 2 is a flow diagram illustrating an exemplary performing a sub-band frequency division processing according to some embodiments of the present disclosure. In some embodiments, a microphone 200 may include at least two acoustoelectric conversion elements 210, a sampling module 220, and a signal processing module 230. The microphone 200 may pick up an external sound signal and transmit the external sound signal to the acoustoelectric conversion element 210, which may convert the sound signal (e.g., the vibration) into an electrical signal. In some embodiments, each of the at least two acoustoelectric conversion element 210 (e.g., a first acoustoelectric conversion element, a second acoustoelectric conversion element, . . . , a nth acoustoelectric conversion element, etc.) has a different frequency response to the sound signal, so that an electrical signal primarily output by each acoustoelectric conversion element may correspond to different frequency range and different frequency band width (i.e., a sub-band frequency division electrical signal 1, . . . , a sub-band frequency division electrical signal n, etc.). For example, the acoustoelectric conversion element may include a first acoustoelectric conversion element, a second acoustoelectric conversion element, a third acoustoelectric conversion element, a fourth acoustoelectric conversion element, which may have a first frequency response, a second frequency response, a third frequency response, and a fourth frequency response, respectively. In some embodiments, the first frequency response, the second frequency response, the third frequency response, and the fourth frequency response may correspond to different frequency ranges, respectively. Alternatively, the first frequency response, the second frequency response and the third frequency response may correspond to different frequency ranges from each other, while the fourth frequency response may have a same frequency range as the third frequency response. In some embodiments, the first frequency response, the second frequency response, the third frequency response, and the fourth frequency response may correspond to a same or different frequency band widths. For example, a frequency bandwidth of the second frequency response may be greater than a frequency bandwidth of the first frequency response, and a frequency bandwidth of the third frequency response may be greater than a frequency bandwidth of the second frequency response. As another example, a frequency bandwidth of the fourth frequency response may be equal to the frequency bandwidth of the third frequency response. In some embodiments, the frequency ranges corresponding to the different acoustoelectric conversion elements may mutually overlap or may not overlap. For example, the first frequency response and the second frequency response may correspond to one of the two adjacent sub-bands, respectively, the frequency range of the second frequency response may include at least a part of the frequency range of the first frequency response, and the frequency range of the second frequency response may have an overlapping part with the frequency range of the first frequency response. As another example, the first frequency response and the fourth frequency response may respectively correspond to one of the two sub-bands that may be not adjacent to each other, and the frequency range of the fourth frequency response may not have a same frequency or frequency range as the first frequency response, and the fourth frequency response may not overlap with the first frequency response. In some embodiments, the resonant frequencies corresponding to different acoustoelectric conversion elements may be different. For example, the resonant frequencies corresponding to each of the first frequency responses, the second frequency response, the third frequency response, and the fourth frequency response may gradually increase. In some embodiments, the second frequency response and the first frequency response may intersect at a location near or at a half-power point. For example, the resonance frequency of the second frequency response may be greater than the resonance frequency of the first frequency response, and a half-power point of the second frequency response may intersect with a half-power point of the first frequency response. In some embodiments, the second frequency response and the first frequency response may intersect at a location not near the half-power point.

In some embodiments, by adjusting dimensions (e.g., a length, a width, a thickness, etc.) or materials of the cantilever beam structure, different cantilever beam structures may generate resonances within desired frequency ranges, respectively, and further obtain frequency responses corresponding to different resonance frequency ranges. Taking the cantilever beam with a cuboid structure for exemplary illustration, in some embodiments, a resonance frequency of an acoustoelectric conversion element 250 may be negatively correlated with a length of the cantilever beam structure. For example, the acoustoelectric conversion element 250 may include a first acoustoelectric conversion element and a second acoustoelectric conversion element, the first acoustoelectric conversion element may include a first cantilever beam structure, and the second acoustoelectric conversion element may include a second cantilever beam structure, wherein a length of the first cantilever beam structure may be greater than a length of the second cantilever beam structure, and a resonance frequency corresponding to the first acoustoelectric conversion element may be lower than a resonance frequency corresponding to the second acoustoelectric conversion element. It should be noted that the first cantilever beam structure and the second cantilever beam structure described herein have same parameters (e.g., a width, a thickness, material) except for the length. In other embodiments, the length, the width, the thickness, and the material of different cantilever beam structures may be adjusted to regulate the resonance frequencies of different cantilever beam structures.

In some embodiments, a plurality of sub-band frequency division electrical signals may be transmitted separately through different parallel circuits. In some embodiments, the plurality of sub-band frequency division electrical signals may further be output in a specific format through a common line according to a specific protocol rule. In some embodiments, the specific protocol rule may include but are not limited to, one or more of direct transmission, an amplitude modulation, a frequency modulation, etc. In some embodiments, the circuit medium may include, but is not limited to, one or more of coaxial cable, communication cable, flexible cable, spiral cable, non-metallic sheathed cable, metal sheathed cable, multi-core cable, twisted pair cable, ribbon cable, shielding cable, telecommunication cable, paired cable, parallel two-core conductor, twisted pair, fiber optic, infrared, electromagnetic, acoustic wave, etc. In some embodiments, the specific format may include, but is not limited to, one or more CD, WAVE, AIFF, MPEG-1, MPEG-2, MPEG-3, MPEG-4, MIDI, WMA, RealAudio, VQF, AMR, APE, FLAC, AAC, etc. In some embodiments, transmission control protocol may include, but are not limited to, one or more of AES3, EBU, ADAT, I2S, TDM, MIDI, CobraNet, Ethernet AVB, Dante, ITU-T G.728, ITU-T G.711, ITU-T G.722, ITU-T G.722.1, ITU-T G.722.1 Annex C, AAC-LD, etc.

In some embodiments, each acoustoelectric conversion element (e.g., the first acoustoelectric conversion element, . . . the nth acoustoelectric conversion element) of the acoustoelectric conversion elements 210 may output a corresponding sub- and frequency division electrical signal respectively (e.g., the sub-band frequency division electrical signal 1, . . . , the sub-band frequency division electrical signal n), and transmit the sub- and frequency division electrical signal to a corresponding sampling module 220 (e.g., a first sampling module 1, . . . , a nth sampling module, etc.) to convert the sub-band frequency division electrical signal (e.g., the sub-band frequency division electrical signal 1, . . . , the sub-band frequency division electrical signal n) into a corresponding digital signal (e.g., a digital signal 1, . . . , a digital signal n, etc.), respectively. For example, the first sampling module may sample the sub-band frequency division electrical signal 1 to convert the sub-band frequency division electrical signal 1 into a digital signal 1. It should be stated that the sub-band frequency division electrical signal may further be referred to as a sub-band. In some embodiments, a count of sampling modules 220 may differ from a count of acoustoelectric conversion elements 210. For example, the sub- and frequency division electrical signals output by the plurality of acoustoelectric conversion elements may be sampled through a same sampling module with a same sampling frequency. In some embodiments, the frequency range of sub-band frequency division electrical signals output by two or more adjacent acoustoelectric conversion elements may be closer. The same sampling module may sample the sub-band frequency division electrical signals output by two or more adjacent acoustoelectric conversion elements to improve the conversion efficiency of the sub-band frequency division electrical signals. To reduce the sampling frequency, sampling data volume, and sampling difficulty, in some embodiments, the sampling frequency of the sampling module 220 may be determined based on the frequency ranges of different sub-band frequency division electrical signals, it may be understood that different sub-band frequency division electrical signals have different frequency ranges, and the sampling module may process different sub-band frequency division electrical signals according to different sampling frequencies. For example, a relatively low sampling frequency may be used for sub-band frequency division electrical signals in the low frequency range to ensure a lower cutoff frequency. As another example, a relatively high sampling frequency may be used for the sub-band frequency division electrical signals in a mid-high frequency range to ensure a relatively high cutoff frequency. The sampling module may process different sub-band frequency division electrical signals according to different sampling frequencies to reduce the data amount of sampling, and further reduce the difficulty and cost of sampling. In addition, the problems such as signal distortion and noise introduction during the sub-band frequency division and sampling processing may be avoided through processing the sub-band signals with different sampling frequencies. In some embodiments, a sampling cutoff frequency of the sampling module corresponding to each sub-band frequency division electrical signal may be greater than a maximum frequency in the resonance frequency range (further referred to as "bandwidth" in the following) corresponding to the sub-band frequency division electrical signal by a specific value. The resonance frequency range corresponding to the sub-band frequency division signal may be a 3 dB bandwidth of the sub-band frequency division electrical signal, which may further be understood as a frequency range defined when the amplitude response drops to ½ of the resonance peak. In some embodiments, the range of the specific value may be greater than 500 Hz. In some embodiments, the range of the specific value may be greater than 600 Hz. In some embodiments, the range of the specific value may be greater than 800 Hz. To improve the conversion quality of the sub-band frequency division electrical signal, in some embodiments, the sampling frequency may be no less than two times the highest frequency of the sub-band frequency division electrical signal bandwidth. In some embodiments, the sampling frequency may be no less than three times the highest frequency of the sub-band frequency division electrical signal bandwidth. In some embodiments, the sampling frequency may be no less than two times the highest frequency of the sub-band frequency division electrical signal bandwidth and no greater than four times the highest frequency of the sub-band Frequency division electrical signal bandwidth.

In some embodiments, the digital signal (e.g., the digital signal 1, . . . , the digital signal n, etc.) output by each sampling module of the sampling module 220 may be further transmitted to the signal processing module 230 for signal processing. In some embodiments, a plurality of digital signals may be transmitted separately to the signal processing module 230 through different parallel circuits. In some embodiments, the plurality of digital signals may further share a common circuit to be transmitted to the signal processing module 230 through a specific format according to a specific protocol rule.

In some embodiments, by setting acoustoelectric conversion elements (e.g., the cantilever beam structure) with different frequency response characteristics in the microphone, a direct sub-band decomposition of the wideband sound signal by the acoustoelectric conversion elements may be realized, which may avoid complex hardware circuit design caused by the use of hardware circuits or software algorithms, relatively high computing resources of the software algorithms, signal distortion, and noise introduction, thus reducing the complexity and production cost of microphones.

It should be noted that the components of the microphone 200 may be not limited to the acoustoelectric conversion element 210, the sampling module 220, and the signal processing module 230 shown in FIG. 2, but may further include other modules, such as a vibration pickup assembly, a vibration transmission assembly, a circuit module, etc., or any combination thereof. It may be further understood that the n illustrated in FIG. 2 (e.g., the nth acoustoelectric conversion element, the nth sampling module, etc.) may be an integer greater than or equal to 2, a specific value of n may be adjusted according to actual application scenarios.

Figure 3:
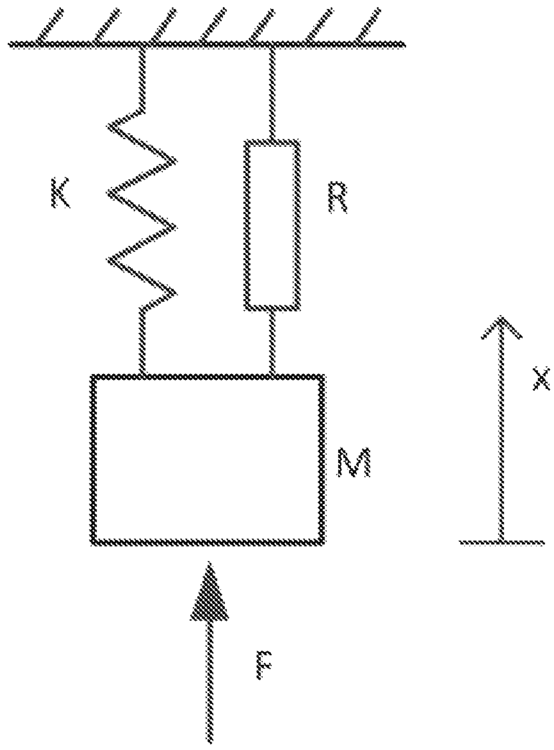
FIG. 3 is a schematic diagram illustrating a spring-mass-damping system of an acoustoelectric conversion element according to some embodiments of the present disclosure.

To facilitate understanding the acoustoelectric conversion element, in some embodiments, the acoustoelectric conversion element of the microphone may be approximately equivalent to a spring-mass-damping system. When the microphone is working, the spring-mass-damping system may generate a vibration under an action of an excitation source (e.g., the vibration of the vibration pickup assembly). FIG. 3 is a schematic diagram illustrating a spring-mass-damping system of an acoustoelectric conversion element according to some embodiments of the present disclosure. As shown in FIG. 3, the spring-mass-damping system may be shifted according to a differential formula (1):

$$M\frac{d^2x}{dt^2} + R\frac{dx}{dt} + Kx = F\cos\omega, \tag{1}$$

wherein M denotes a mass of the spring-mass-damping system, x denotes a displacement of the spring-mass-damping system, R denotes a damping of the spring-mass-damping system, K denotes an elasticity coefficient of the spring-mass-damping, F denotes an amplitude of a driving force, and ω denotes a circular frequency of an external force.

The differential formula (1) may be solved to obtain the displacement in the steady state (2):

$$x = x_a \cos(\omega t - \theta), \tag{2}$$

wherein, x denotes a value that a deformation of the spring-mass-damper system, which is equal to an output electric signal when the microphone is working, $x_a$ in $$x_a = \frac{F}{\omega|Z|} = \frac{F}{\omega\sqrt{R^2 + (\omega M - K\omega^{-1})^2}}$$

denotes an output displacement, Z denotes a mechanical impedance, and θ denotes an oscillation phase.

A normalization of the ratio of displacement amplitude A may be described as formula (3):

$$A = \frac{x_a}{x_{a0}} = \frac{Q_m}{\sqrt{\frac{f^2}{f_0} + \left(\frac{f^2}{f_0} - 1\right)^2 Q_m^2}}, \quad (3)$$

wherein $x_{a0}$ in $$x_{a0} = \frac{F}{K}$$

denotes a displacement amplitude at a steady state (or when $$\omega = 0), \frac{f}{f_0} \text{ in } \frac{f}{f_0} = \frac{\omega}{\omega_0}$$

denotes a ratio of an external force frequency to an intrinsic frequency, $\omega_0$ in $\omega_0$=K/M denotes a circular frequency of the vibration, $Q_m$ in $$Q_m = \frac{\omega_0 M}{R}$$

denotes a mechanical quality factor.

Figure 4:
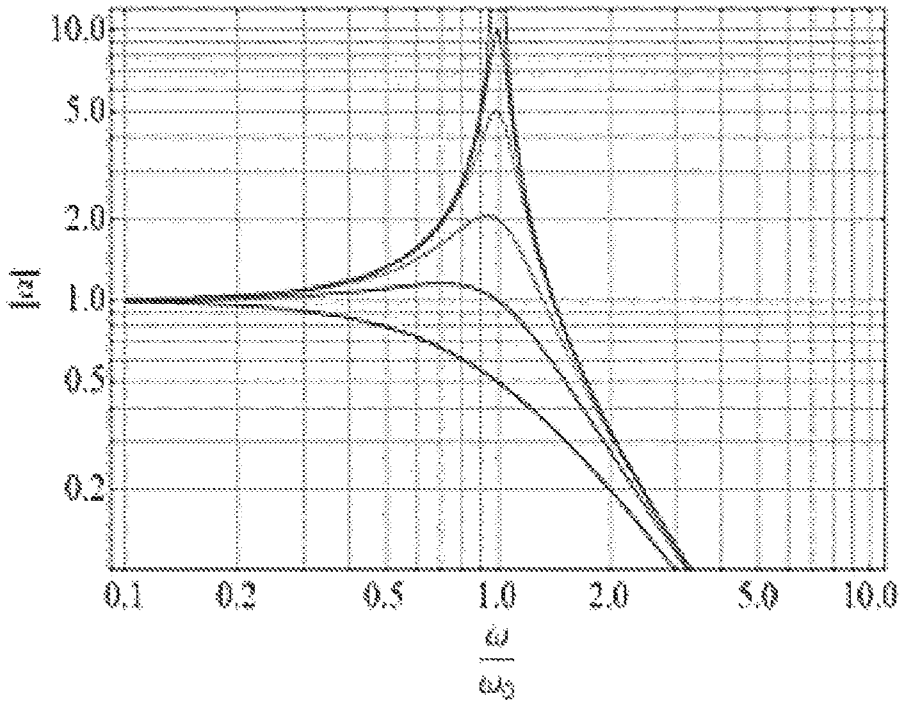
FIG. 4 is a schematic diagram illustrating an exemplary normalization of a displacement resonance curve of a spring-mass-damping system according to some embodiments of the present disclosure.

FIG. 4 is a schematic diagram illustrating an exemplary normalization of a displacement resonance curve of a spring-mass-damping system according to some embodiments of the present disclosure. A horizontal axis denotes a ratio of an actual vibration frequency of the spring-mass-damped system to an intrinsic frequency of spring-mass-damped system, and a vertical axis denotes a normalization displacement of the spring-mass-damping system. The individual curves in FIG. 4 respectively denotes the displacement resonance curves of the spring-mass-damping system with different parameters. In some embodiments, the microphone may generate an electrical signal through a relative displacement between the acoustoelectric conversion element and the shell structure. For example, an electret microphone may generate an electrical signal based on a change in distance between a deformed diaphragm and a substrate. As another example, a cantilever beam bone conduction microphone may generate an electrical signal based on piezoelectricity caused by the deformed cantilever beam structure or capacitance changes due to a change in distance between cantilever beams. In some embodiments, the greater the displacement of the cantilever beam structure deformation, the greater the electrical signal output by the microphone. As shown in FIG. 4, when the actual vibration frequency of the spring-mass-damping system may be the same or approximately the same as the intrinsic frequency of the spring-mass-damping system (i.e., when the ratio $\omega/\omega_0$ between the actual vibration frequency of the spring-mass-damping system and the intrinsic frequency of the spring-mass-damping system is equal or approximately equal to 1), the larger the normalization displacement of the spring-mass-damping system is, the narrower the 3 dB band width of the resonance peak in the displacement resonance curve (may be understood as the resonance frequency range herein). Combining with the above formula (3), the larger the normalization displacement of the spring-mass-damped system, the larger the Q value of the microphone.

Figure 5:
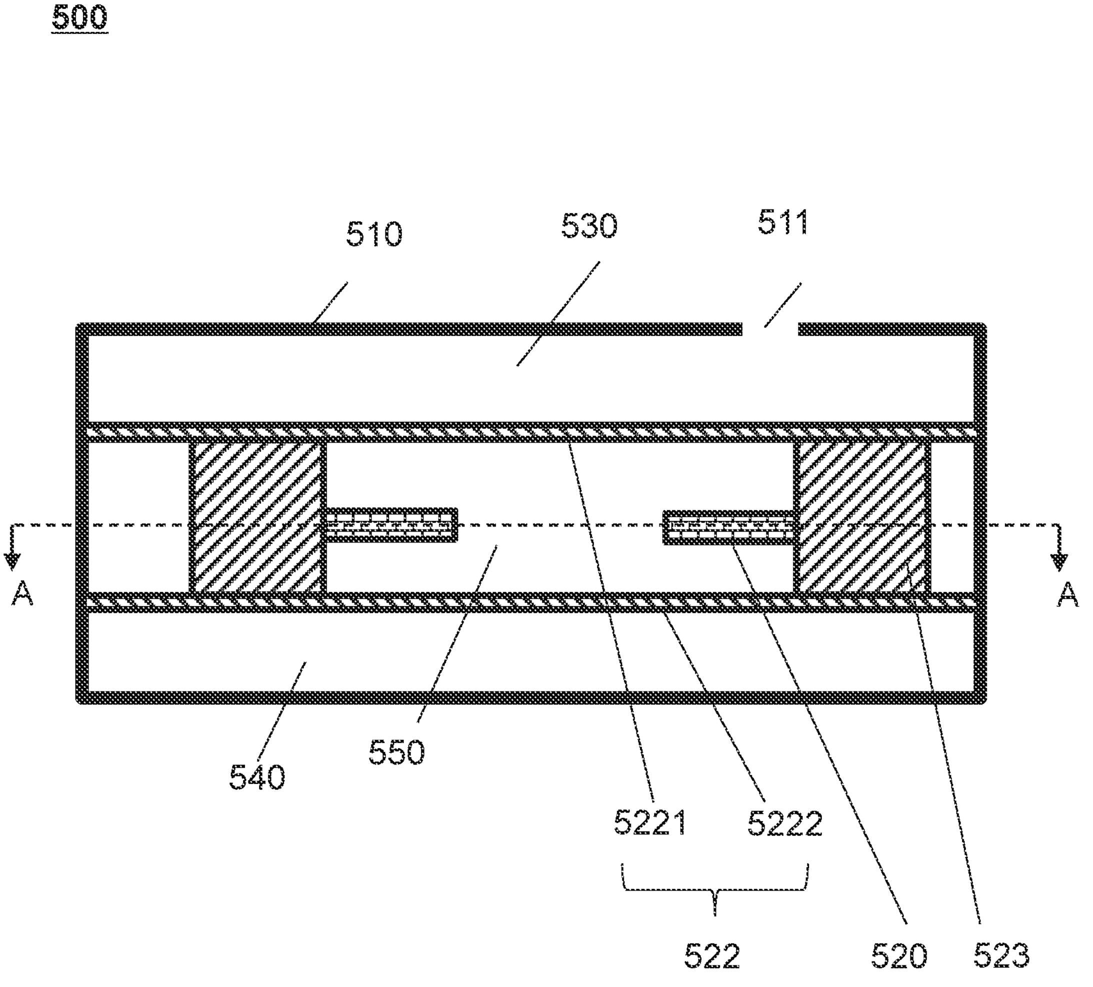
FIG. 5 is a schematic diagram illustrating a structural diagram of a microphone according to some embodiments of the present disclosure.

FIG. 5 is a schematic diagram illustrating a microphone according to some embodiments of the present disclosure. A microphone 500 may include a shell structure 510, at least two acoustoelectric conversion elements 520, and a vibration pickup assembly 522. The shell structure 510 may be configured to carry the vibration pickup assembly 522 and the acoustoelectric conversion element 520. In some embodiments, the shell structure 510 may be a regular structural body such as a cuboid, a cylinder, a frustum of a cone, or other irregular structural body. In some embodiments, the shell structure 510 may be an internally hollow structural body, and the shell structure 510 may independently form an acoustic cavity where the vibration pickup assembly 522 and the at least two acoustoelectric conversion elements 520 may be located. In some embodiments, material of the shell structure 510 may include but is not limited to, one or more metal, alloy, and polymeric (e.g., an acrylonitrile-butadiene-styrene copolymer, a polyvinyl chloride, a polycarbonate, a polypropylene, etc.). In some embodiments, the vibration pickup assembly 522 may be connected with a side wall of the shell structure 510, so that the acoustic cavity formed by the shell structure 510 may be divided into a plurality of cavities, which may include a first acoustic cavity 530 and a second acoustic cavity 540.

In some embodiments, one or more holes 511 may be provided in the side wall of the shell structure 510 corresponding to the first acoustic cavity 530, and the one or more holes 511 may be located in the first acoustic cavity 530 and guide the external sound signal into the first acoustic cavity 530. In some embodiments, the external sound signal may enter the first acoustic cavity 530 of the microphone 500 from the holes 511 and guide air into the first acoustic cavity 530 to vibrate. The vibration pickup assembly 522 may pick up an air vibration signal and transmit the air vibration signal to the acoustoelectric conversion element 520, and the acoustoelectric conversion element 520 may receive the air vibration signal and convert the air vibration signal into an electrical signal to output.

In some embodiments, the vibration pickup assembly 522 may include a first vibration pickup assembly 5221 and a second vibration pickup assembly 5222 sequentially arranged from top to bottom. The first vibration pickup assembly and the second vibration may be connected with the shell structure through a peripheral side, and at least partial structure of the first vibration pickup assembly 5221 and the second vibration pickup assembly 5222 may generate vibration in response to an acoustic signal entered the microphone 500 through the holes 511. In some embodiments, material of the vibration pickup assembly 522 may include but is not limited to, one or more semiconductor material, metal material, metal alloy, organic material, etc. In some embodiments, the semiconductor material may include but is not limited to, silicon, silicon dioxide, silicon nitride, silicon carbide, etc. In some embodiments, the metallic material may include but is not limited to, copper, aluminum, chrome, titanium, gold, etc. In some embodiments, the metal alloy may include but is not limited to, copper-aluminum alloy, copper-gold alloy, titanium alloy, aluminum alloy, etc. In some embodiments, the organic material may include but is not limited to, polyimide, parylene, PDMS, silicone gel, silicone, etc. In some embodiments, the vibration pickup assembly 522 may have platy structure, prismatic structure, etc.

In some embodiments, different regions of the vibration pickup assembly 522 may be made of different materials.

For example, material of the partial of the vibration pickup assembly 522 that may be in contact with a vibration pickup transmission assembly 523 and material of the partial of the vibration pickup assembly 522 corresponding to a cavity 550 may be a rigid material, and the stiffness may be greater than the stiffness of other regions of the vibration pickup assembly 522, for example, a stiffness of an edge region that may move relatively to the shell structure 510 primarily in response to air vibration. In some embodiments, a partial structure composed of rigid materials in the vibration pickup assembly 522 may be hardly deformed under the action of the air vibration in the first acoustic cavity 530, which may keep a volume of the cavity 550 basically constant, avoid the effect of a change of the volume of the cavity 550 on an acoustoelectric conversion element 1320, and further ensure that the acoustoelectric conversion element 520 may convert a received vibration signal from the vibration pickup assembly 522 into an electrical signal within a desired frequency range. In some embodiments, the cavity 550 may be a vacuum cavity. The acoustoelectric conversion element 520 may be located in the vacuum cavity, which may avoid contact between the acoustoelectric conversion element 510 and the air of the acoustic cavity, and reduce the influence of the air vibration of the acoustic cavity during an acoustoelectric conversion process of the acoustoelectric conversion element 520, i.e., problem of a large background noise of the microphone may be solved. On the other hand, the acoustic electric conversion element 520 may be located in the vacuum cavity, which may avoid a friction between the acoustic electric conversion element 520 and air during the vibration process, to reduce an air damping inside the vacuum cavity of the microphone 500 and improve a Q value of the microphone 500. In some embodiments, a vacuum degree of the cavity 550 may be less than 100 PA. In some embodiments, a vacuum degree of the cavity 550 may be $10^{-6}$ Pa-100 Pa. In some embodiments, a vacuum degree of the cavity 550 may be $10^{-3}$ Pa-100 Pa. In some embodiments, a vacuum degree of the cavity 550 may be 1 Pa-100 Pa.

In some embodiments, the microphone 500 may include a vibration transmission assembly 523. The vibration transmission assembly 523 may be arranged between a first vibration pickup assembly 5221 and a second vibration pickup assembly 5222. An upper surface of the vibration transmission assembly 523 may be connected with a lower surface of the first vibration pickup assembly 5221, and a lower surface of the vibration transmission assembly 523 may be connected with an upper surface of the second vibration pickup assembly 5222. In some embodiments, the cavity 550 may be formed between the vibration transmission assembly 523, the first vibration pickup assembly 5221, the second vibration pickup assembly 5222, and the acoustoelectric conversion element 520 may be located in the cavity 550. Specifically, one end of the acoustoelectric conversion element 520 may be connected with an inner wall of the vibration transmission assembly 523, and another end of the acoustoelectric conversion element 520 may be suspended in the cavity 550. In some embodiments, the vibration pickup assembly 522 (e.g., the first vibration pickup assembly 5221, the second vibration pickup assembly 5222) may transmit the vibration signal to the acoustoelectric conversion element 520 via the vibration transmission assembly 523. In some embodiments, material of the vibration transmission assembly 523 may include but is not limited to, one or more semiconductor material, metal material, metal alloy, organic material, etc. In some embodiments, material of the vibration transmission assembly 523 may be same or different from the material of the vibration pickup assembly 522. In some embodiments, the vibration transmission assembly 523 and the vibration pickup assembly 522 may be integrated structure. In some embodiments, the vibration transmission assembly 523 and the vibration pickup assembly 522 may further be relatively independent structure. In some embodiments, the vibration transmission assembly 523 may be regular and/or irregular polygonal structure, such as tubular structure, annular structure, quadrilateral structure, and pentagon structure.

It should be noted that, in alternative embodiments, the vibration pickup assembly 522 may include a first vibration pickup assembly 5221 only, the first vibration pickup assembly 5221 may be connected with the shell structure 510 through a peripheral side, and one or more acoustoelectric conversion elements 520 may be directly or indirectly connected with the first vibration pickup assembly 5221. For example, the acoustoelectric conversion elements 520 may be located on an upper or lower surface of the first vibration pickup assembly 5221, and the one or more acoustoelectric conversion elements 520 may be distributed at intervals at the upper or lower surface of the first vibration pickup assembly 5221, wherein the one or more acoustoelectric conversion elements 520 may not contact each other. As another example, the acoustoelectric conversion element 520 may be connected with the first vibration pickup assembly 5221 through other structures (e.g., the vibration transmission assembly 523). The first vibration pickup assembly 5221 may generate the vibration in response to an acoustic signal entering the microphone 500 through the hole 511, and the acoustoelectric conversion element 520 may convert the vibration of the first vibration pickup assembly 5221 or the vibration transmission assembly 523 into an electrical signal.

Figure 6A:
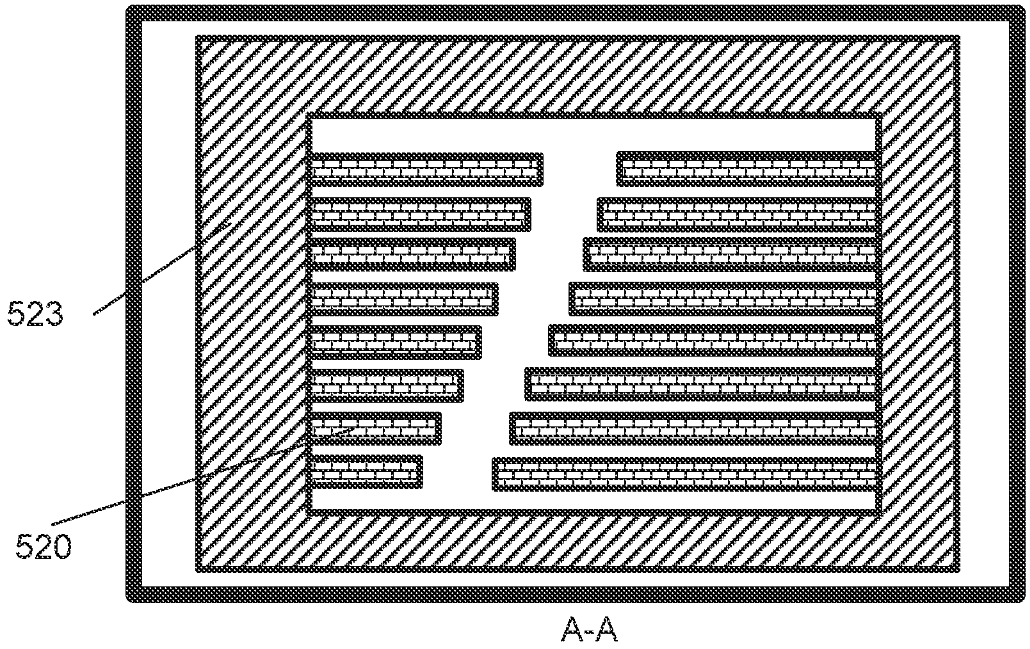
FIG. 6A is a sectional schematic diagram illustrating a microphone along an A-A direction in FIG. 5.
Figure 6B:
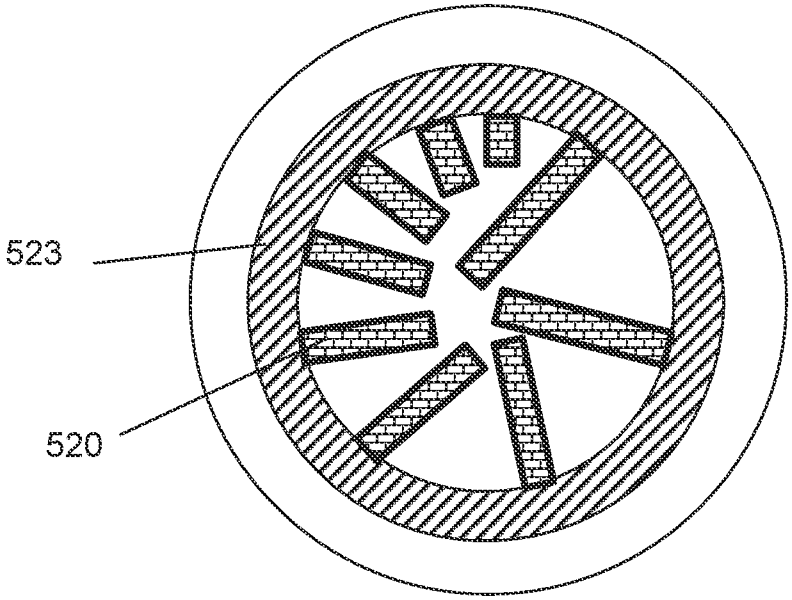
FIG. 6B is a sectional schematic diagram illustrating a microphone perpendicular to an A-A direction in FIG. 5.
Figure 7A:
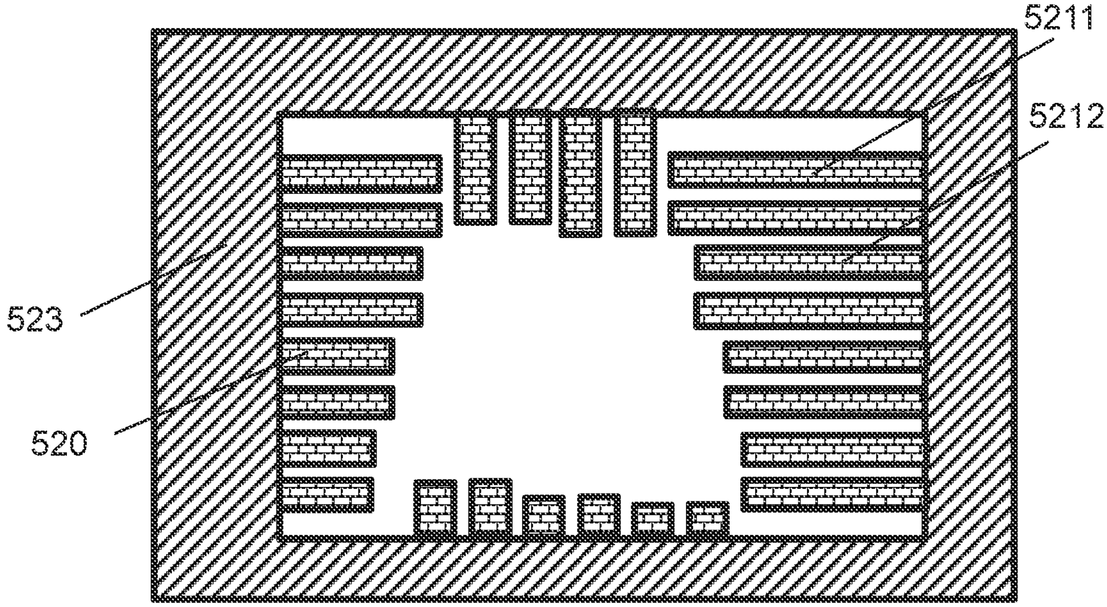
FIG. 7A is a schematic diagram illustrating a cantilever beam structure according to some embodiments of the present disclosure.
Figure 7B:
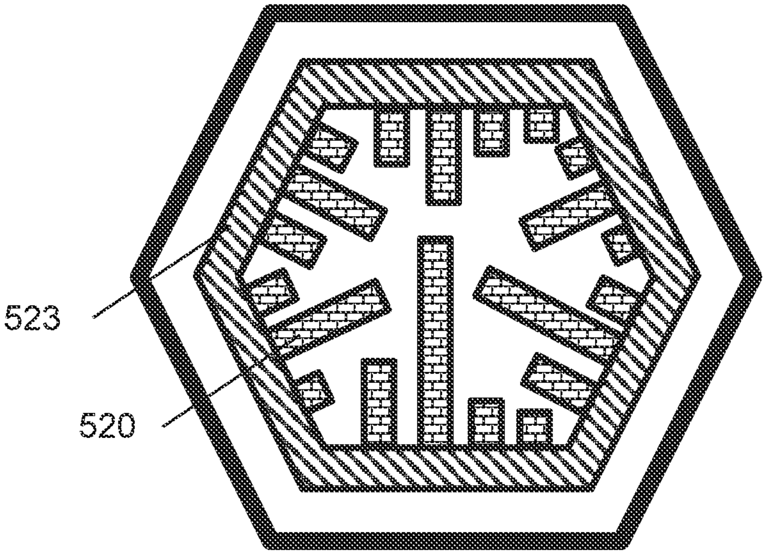

In some embodiments, the one or more acoustoelectric conversion elements 520 may be distributed at intervals at the inner wall of the vibration transmission assembly 523. It should be noted that the interval distribution may refer to either a horizontal direction (perpendicular to an A-A direction shown in FIG. 5) or a vertical direction (the A-A direction shown in FIG. 5). For example, when the vibration transmission assembly 523 is an annular tubular structure, the one or more acoustoelectric conversion elements 520 may be distributed at intervals sequentially from top to bottom in the vertical direction. FIG. 6A is a sectional schematic diagram illustrating a microphone along an A-A direction in FIG. 5. As shown in FIG. 6A, the plurality of acoustoelectric conversion elements 520 may be sequentially distribute at intervals at the inner wall of the vibration transmission assembly 523. The plurality of acoustoelectric conversion elements 520 distributed at intervals may be on the same plane or approximately parallel in the horizontal direction. FIG. 6B is a sectional schematic diagram illustrating a microphone along an A-A direction in FIG. 5 As shown in FIG. 6B, an fixed end of each acoustoelectric conversion element 520 and the vibration transmission assembly 530 may be distributed at intervals at an annular inner wall of the vibration transmission assembly 523 in the horizontal direction, the fixed end of the acoustoelectric conversion elements 520 may be approximately perpendicular to the vibration transmission assembly 523, and another end of the acoustoelectric conversion elements 520 (further be referred to the free end) may extend toward a center direction of the vibration transmission assembly 523 and suspend in the cavity 550, so that the acoustoelectric conversion element 520 may be annularly distributed in the horizontal direction. In some embodiments, the vibration transmission assembly 523 may be in a polygonal tubular structure (e.g., triangular, pentagonal, hexagonal, etc.), the fixed ends of the plurality of acoustoelectric conversion elements 520 may further be distributed at intervals at each side wall of the vibration transmission assembly 523 in the horizontal direction. FIG. 7A is a schematic diagram illustrating a cantilever beam structure according to some embodiments of the present disclosure. As shown in FIG. 7A, the vibration transmission assembly 523 may be a quadrilateral structure, and the plurality of acoustoelectric conversion elements 520 may be alternately distributed on four side walls of the vibration transmission assembly 523. FIG. 7B is a schematic diagram illustrating a cantilever beam structure according to some embodiments of the present disclosure. As shown in FIG. 7B, the vibration transmission assembly 523 may be a hexagonal structure, and cantilever beam structures 521 of different lengths may be alternately distributed on six side walls of the vibration transmission assembly 523. The plurality of acoustoelectric conversion elements 520 distributed at interval at the inner wall of the vibration transmission assembly 523 may improve the utilization of the space of the cavity 550 and reduce an overall volume of the microphone 500.

It should be noted that the plurality of acoustoelectric conversion elements 520 may be not limited to being distributed at intervals at all inner walls of the vibration transmission assembly 523 in the horizontal or vertical direction, the plurality of acoustoelectric conversion elements 520 may further be arranged on a side wall or partial side walls of the vibration transmission assembly 523, or the plurality of acoustoelectric conversion elements 520 may be in the same horizontal plane. For example, the vibration transmission assembly 523 may be a cuboid structure, and the plurality of acoustoelectric conversion elements 520 may be simultaneously arranged on a side wall, two opposite or adjacent side walls, or any three side walls of the cuboid structure. The distribution manner of the plurality of acoustoelectric conversion elements 520 may be adjusted according to the number or size of the cavity 550, which may not be further limited.

In some embodiments, each acoustoelectric conversion element 520 may include a cantilever beam structure, one end of the cantilever beam structure may be connected with the inner wall of the vibration transmission assembly 523, and another end of the cantilever beam structure may be suspended in the cavity 550.

Figure 21:
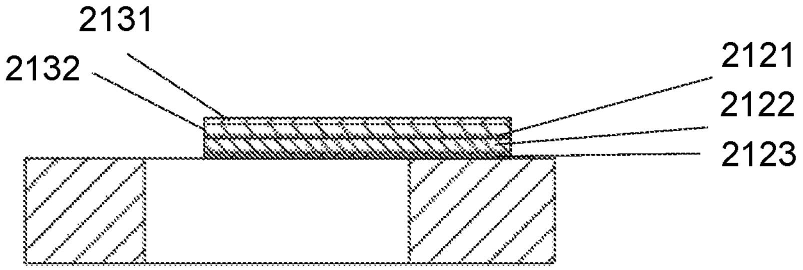
FIG. 21 is a schematic digaram illustrating a cantilever beam structure according to some embodiments of the present disclosure.

In some embodiments, the cantilever beam structure may include a first electrode layer 2121, a piezoelectric layer 2122, a second electrode layer 2123, an elastic layer 2131, and a substrate layer 2132. See, for example, FIG. 21. The first electrode layer 2121, the piezoelectric layer 2122, and the second electrode layer 2123 may be sequentially arranged from top to bottom, the elastic layer 2131 may be located on an upper surface of the first electrode layer 2121 or a lower surface of the second electrode layer 2123, and the substrate layer 2132 may be located on an upper or lower surface of the elastic layer 2131. In some embodiments, the external sound signal may enter the acoustic cavity 530 of the microphone 500 through the hole 511 and transmit the air into the first acoustic cavity 530 to generate the vibration. The air vibration signal may be picked up and transmitted to the acoustoelectric conversion element 520 (e.g., the cantilever beam structure) through the vibration pickup assembly 520, and the elastic layer 2131 in the cantilever beam structure may deform under the action of the vibration signal. In some embodiments, the piezoelectric layer 2122 may generate the electrical signal based on a deformation of the elastic layer 2131, and the first electrode layer 2121 and the second electrode layer 2123 may collect the electrical signal. In some embodiments, the piezoelectric layer 2122 may generate, based on a piezoelectric effect, a voltage (an electrical potential difference) under the action of deformation-under-stress of the elastic layer 2131, and the first electrode layer 2121 and the second electrode layer 2123 may export the voltage (the electrical signal).

In some embodiments, the elastic layer 2131 may be a membrane structure or a block structure supported by one or more semiconductor materials. In some embodiments, the semiconductor material may include but is not limited to, silicon, silicon dioxide, silicon nitride, gallium nitride, zinc oxide, silicon carbide, etc. In some embodiments, material of the piezoelectric layer 2122 may include piezoelectric crystal material and piezoelectric ceramic material. The piezoelectric crystal material may refer to piezoelectric single crystal. In some embodiments, the piezoelectric crystal material may include crystal, sphalerite, aragonite, tourmaline, rhodochrosite, GaAs, barium titanate and the derived structural crystal, KH2PO4, NaKC4H4O6-4H2O (Rochelle salt), etc., or any combination thereof. The piezoelectric ceramic material may refer to piezoelectric polycrystal that is an irregular collection of microfine grain obtained by solid-state reaction and sintering between different material powder grain. In some embodiments, the piezoelectric ceramic material may include barium titanate (BT), lead zirconate titanate (PZT), lead barium lithium niobate (PBLN), modified lead titanate (PT), aluminum nitride (AlN), zinc oxide (ZnO), etc., or any combination thereof. In some embodiments, the piezoelectric layer 2122 material may further include piezoelectric polymer material, such as polyvinylidene difluoride (PVDF). In some embodiments, the first electrode layer 2121 and the second electrode layer 2123 may be a conductive material structure. An exemplary conductive material may include metal, alloy material, metal oxide material, graphene, etc., or any combination thereof. In some embodiments, metal and alloy material may include nickel, iron, lead, platinum, titanium, copper, molybdenum, zinc, or any combination thereof. In some embodiments, the metal oxide material may include RuO2, MnO2, PbO2, NiO, etc., or any combination thereof.

In some embodiments, the cantilever beam structure may further include a wire binding electrode layer (a PAD layer), the wire binding electrode layer may be located on the first electrode layer 2121 and the second electrode layer 2123, and the first electrode layer 2121 and the second electrode layer 2123 may be connected with an external circuit through an external wire binding (e.g., a gold wire, an aluminum wire, etc.), and a voltage signal between the first electrode layer 2121 and the second electrode layer 2123 may be guided to a back-end processing circuit. In some embodiments, material of the wire binding electrode layer may include copper foil, titanium, copper, etc. In some embodiments, the material of the wire binding electrode layer may be the same as the material of the first electrode layer 2121 (or the second electrode layer 2123. In some embodiments, the material of the wire binding electrode layer may be different from the material of the first electrode layer 2121 (or the second electrode layer 2123.

Figure 22:
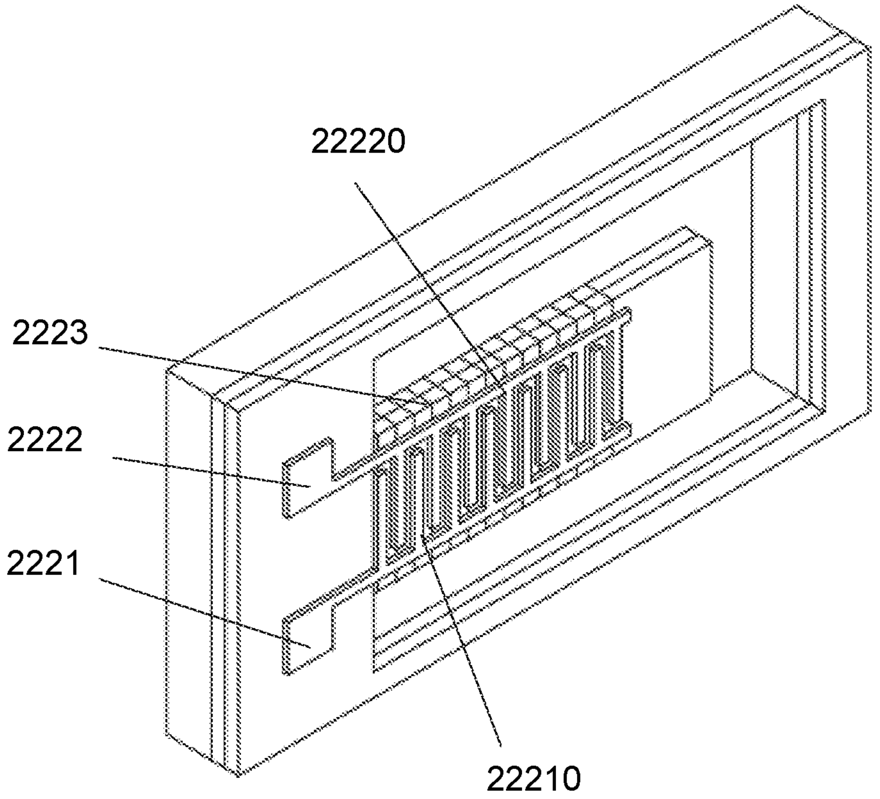
FIG. 22 is a schematic diagram illustrating a cantilever beam structure according to some embodiments of the present disclosure.

In other embodiments, the cantilever beam structure may include at least an elastic layer, an electrode layer, and a piezoelectric layer 2223, wherein the elastic layer may be located on a surface of the electrode layer and the electrode layer may be located on an upper or lower surface of the piezoelectric layer 2223. In some embodiments, the electrode layer may include a first electrode 2221 and a second electrode 2222. See, for example, FIG. 22. The first electrode 2221 and the second electrode 2222 may be bent into a comb-like structure, and the first comb-like structure 22210 and a second comb-like structure 22220 may include a plurality of comb-teeth structures with a certain gap between the adjacent comb-teeth structures, the distance may be same or different. The first comb-like structure 22210 and the second comb-like structure 22220 may cooperate to form an electrode layer, a comb-teeth structure of the first comb-like structure 22210 may further extend into a gap of the second comb-like structure 22220, and a comb-teeth structure of the second comb-like structure 22220 may extend into a gap of the first comb-like structure 22210 to form an electrode layer through cooperating. The first comb-teeth structure and the second comb-teeth structure may cooperate with each other, so that the first electrode and the second electrode may be arranged compactly, but not intersected. In some embodiments, the first comb-like structure 22210 and the second comb-like structure 22220 may extend along a length direction (e.g., from the fixed end to the free end) of the cantilever beam. More information about the elastic layer and piezoelectric layer may be referred to FIG. 5 and related descriptions. In some embodiments, each cantilever beam structure of the different acoustoelectric conversion elements 520 may respectively form a cantilever beam resonance system, and the resonance frequency of the cantilever beam resonance system may be expressed by formula (4)

$$f_0 = 2\pi\sqrt{\frac{k}{m}}, \tag{4}$$

wherein $f_0$ denotes a resonance frequency of the resonance system, k denotes a stiffness of the resonance system, and m denotes a mass of the resonance system. According to the formula (4), when a ratio of the stiffness of the resonance system to mass of the resonance system $$\frac{k}{m}$$

decreases, the resonance frequency of the resonance system $f_0$ may decreases. In some embodiments, the sensitivity of the resonance system may be improved in a particular frequency range (e.g., less than the resonance frequency) by changing the resonance frequency of the resonance system.

In some embodiments, when the cantilever beam structure is a cuboid structure, the formula (4) for calculating the resonance frequency of the cantilever beam resonance system may be further expressed by formula (5):

$$f_0 = 2\pi \times 1.875104^2\sqrt{\frac{EI}{\rho A l^4}}, \tag{5}$$

wherein $f_0$ denotes a resonance frequency of the resonant system, E denotes an elastic modulus of material of the cantilever beam structure, I denotes a moment of inertia of the cantilever beam structure (may be interpreted as a length of the cantilever beam structure), ρ denotes a density of the cantilever beam structure, and A denotes cross-section area of the cantilever beam structure $$I = \frac{bh^3}{12},$$

wherein b denotes a width of the cross-section of the cantilever beam structure and h denotes a height of the cross-section of the cantilever beam structure. According to the formula (5), with a same cross-section size (i.e., a width and height of the cantilever beam structure) and material, the longer the length of the cantilever beam structure, the smaller the resonance frequency of the cantilever beam structure.

Based on the above descriptions, in some embodiments, by setting different acoustoelectric conversion elements 520 (e.g., cantilever beam structures of different lengths), different acoustoelectric conversion elements 520 may have different resonant frequencies respectively, so that different frequency responses may be generated to the vibration signals of the vibration transmission assembly 523. In some embodiments, the parameters of the cantilever beam structure (e.g., the length, the width, the thickness, the material, etc.) may be set to obtain frequency responses corresponding to different resonant frequencies. In some embodiments, the resonance frequency corresponding to the cantilever beam structure may be negatively correlated with the length perpendicular to the vibration direction of the cantilever beam structure, i.e., the longer the length of the cantilever beam structure in the direction perpendicular to its vibration, the smaller the resonance frequency corresponding to the cantilever beam structure. For example, a length of the first cantilever beam structure 5211 perpendicular to the vibration direction as shown in FIG. 7A may be greater than a length of the second cantilever beam structure perpendicular to the vibration direction, and a resonance frequency corresponding to the first cantilever beam structure 5211 may be lower than a resonance frequency corresponding to the second cantilever beam structure 5212. In some embodiments, at least two of the plurality of resonant frequencies corresponding to the different cantilever beam structures may be within a range of 20 Hz-16000 Hz by adjusting the length of the cantilever beam structure 5212. In some embodiments, the at least two of the plurality of resonant frequencies corresponding to different cantilever beam structures may be within a range of 100 Hz-12000 Hz by adjusting the length of the cantilever beam structure 5212. Since the cantilever beam structure is sensitive to vibrations near the resonance frequency, it may be considered that the cantilever beam structure has a frequency selective characteristic for the vibration signal, i.e., the cantilever beam structure may mainly convert the sub-band vibration signal near the resonance frequency into the electrical signal. Therefore, in some embodiments, by setting to different lengths, different cantilever beam structures may have different resonance frequencies, thereby respectively forming sub-bands around each resonance frequency. For example, 11 sub-bands may be set within a frequency range of human voice through the plurality of cantilever beam structures, and the resonance frequency of each of the 11 sub-bands corresponding to the cantilever beam structure may be within a range of 500 Hz-700 Hz, 700 Hz-1000 Hz, 1000 Hz-1300 Hz, 1300 Hz-1700 Hz, 1700 Hz-2200 Hz, 2200 Hz-3000 Hz, 3000 Hz-3800 Hz, 3800 Hz-4700 Hz, 4700 Hz-5700 Hz, 5700 Hz-7000 Hz, and 7000 Hz-12000 Hz, respectively. As another example, 16 sub-bands may be set within the frequency range of human voice through the plurality of cantilever beam structures, and the resonance frequency of each of the 16 sub-bands corresponding to the cantilever beam structure may be within a range of 500 Hz-640 Hz, 640 Hz-780 Hz, 780 Hz-930 Hz, 940 Hz-1100 Hz, 1100 Hz-1300 Hz, 1300 Hz-1500 Hz, 1500 Hz-1750 Hz, 1750 Hz-1900 Hz, 1900 Hz-2350 Hz, 2350 Hz-2700 Hz, 2700 Hz-3200 Hz, 3200 Hz-3800 Hz, 3800 Hz-4500 Hz, 4500 Hz-5500 Hz, 5500 Hz-6600 Hz, 6600 Hz-8000 Hz, respectively. As further an example, 24 sub-bands may be set within the frequency range of human voice through the plurality of cantilever beam structures, and a resonance frequency of each of the 24 sub-bands corresponding to the cantilever beam structure may be within a range of 20 Hz-120 Hz, 120 Hz-210 Hz, 210 Hz-320 Hz, 320 Hz-410 Hz, 410 Hz-500 Hz, 500 Hz-640 Hz, 640 Hz-780 Hz, 780 Hz-930 Hz, 940 Hz-1100 Hz, 1100 Hz-1300 Hz, 1300 Hz-1500 Hz, 1500 Hz-1750 Hz, 1750 Hz-1900 Hz, 1900 Hz-2350 Hz, 2350 Hz-2700 Hz, 2700 Hz-3200 Hz, 3200 Hz-3800 Hz, 3800 Hz-4500 Hz, 4500 Hz-5500 Hz, 5500 Hz-6600 Hz, 6600 Hz-7900 Hz, 7900 Hz-9600 Hz, 9600 Hz-12100 Hz, 12100 Hz-16000 Hz, respectively. Taking the cantilever beam structure with a cuboid structure as an example, in some embodiments, at least 5 sub-bands may be formed within the frequency range of human voice (e.g., 20 Hz-16000 Hz) through adjusting different lengths of the plurality of cantilever beam structures. In some embodiments, 5-11 sub-bands may be formed within the frequency range of human voice in the frequency range of human voice (e.g., 20 Hz-16,000 Hz) through adjusting different lengths of the plurality of cantilever beam structures. In some embodiments, 5-16 sub-bands may be formed within the frequency range of human voice in the frequency range of human voice (e.g., 20 Hz-16,000 Hz) through adjusting different lengths of the plurality of cantilever beam structures. In some embodiments, 6-24 sub-bands may be formed within the frequency range of human voice (e.g., 20 Hz-16,000 Hz) by adjusting different lengths of the plurality of cantilever beam structures. It should be noted that the acoustoelectric conversion element (or the cantilever beam structure), the count of sub-bands, and the frequency range of the resonance frequency corresponding to each sub-band may be not limited to the above descriptions, and may be adjusted adaptively according to the application scenario of the microphone, the size of the microphone, and other specific situations, and may not be restricted here. Moreover, the shape of the cantilever beam structure may be not limited to a cuboid descripted above and may be further available in other shapes, a cross-section shape of the cantilever beam structure may be regular or irregular shapes such as triangle, half pearl, rhombus, pentagon, and hexagon, besides, different cantilever beams may have different resonant frequencies through adjusting the parameters related to the mass or stiffness of the cantilever beam structure.

In some embodiments, the acoustoelectric conversion elements 520 of the microphone 500 may generate resonance within a desired frequency range respectively through adjusting parameters of the first acoustic cavity 530 and/or the holes 511, such as structure, size, inner surface roughness, etc. For example, sub-band division to vibration signal may be completed by adjusting the shape, cavity volume, and inner surface roughness of the first acoustic cavity 530 to allow the sound entering the first acoustic cavity 530 to have a specific sub-band frequency. The content that the microphone 500 respectively generates resonance within a desired frequency range through adjusting the parameters such as the structure, the size, and the inner surface roughness may refer to a patent application titled "A microphone" filed on the even day as the present disclosure, and may not be described herein.

Figure 8:
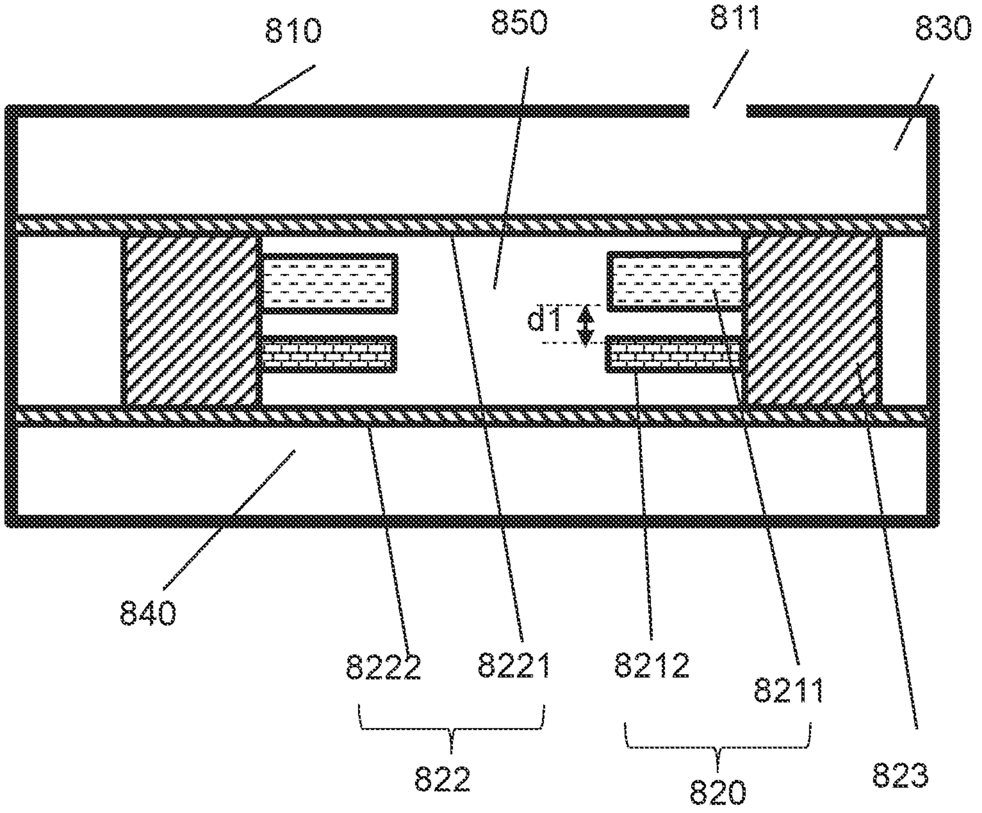
FIG. 8 is a schematic diagram illustrating a microphone according to some embodiments of the present disclosure.

FIG. 8 is a schematic diagram illustrating a microphone according to some embodiments of the present disclosure. As shown in FIG. 8, the microphone 800 may include a shell structure 810, an acoustoelectric conversion element 820, and a vibration pickup assembly 822. The microphone 800 shown in FIG. 8 may be same or similar to the microphone 500 shown in FIG. 5. For example, the shell structure 810 of microphone 800 may be same or similar to the shell structure 510 of microphone 500. As another example, a first acoustic cavity 830, a second acoustic cavity 840, and a cavity 850 of the microphone 800 may be respectively the same as or similar to the first acoustic cavity 530, the second acoustic cavity 540, and the cavity 550 of the microphone 500. As further an example, the vibration pickup assembly 822 (e.g., a first vibration pickup assembly 8221, a second vibration pickup assembly 8222) of the microphone 800 may be same or similar to the vibration pickup assembly 522 (e.g., a first vibration pickup assembly 5221, a second vibration pickup assembly 5222) of the microphone 500. More structures about the microphone 800 (e.g., a hole 811, a vibration transmission assembly 823, etc.) may be referred to FIG. 5 and related description.

In some embodiments, a main difference between the microphone 800 shown in FIG. 8 and the microphone 500 shown in FIG. 5 is that each acoustoelectric conversion element 820 of the microphone 800 may include a first cantilever beam structure 8211 and a second cantilever beam structure 8212, wherein the first cantilever beam structure 8211 and the second cantilever beam structure 8212 may be considered as two electrode plates. In some embodiments, the first cantilever beam structure 8211 and the second cantilever beam structure 8212 may be set opposite to each other, and the first cantilever beam structure 8211 and the second cantilever beam structure 8212 have a facing area. In some embodiments, the first cantilever beam structure 8211 and the second cantilever beam structure 8212 may be arranged in vertical direction, the facing area may be interpreted as a projection area between a lower surface of the first cantilever beam structure 8211 and an upper surface of the second cantilever beam structure 8212. In some embodiments, the first cantilever beam structure 8211 and the second cantilever beam structure 8212 have a first distance d1. The first cantilever beam structure 8211 and the second cantilever beam structure 8212 may respectively deform to different degrees in the vibration direction (an extension direction of the first distance d1) after receiving the vibration signal from the vibration transmission assembly 823 to change the first distance d1. The first cantilever beam structure 8211 and the second cantilever beam structure 8212 may convert the received vibration signal of the vibration transmission assembly 823 into an electrical signal based on the change in the first distance d1.

In some embodiments, a stiffness of the first cantilever beam structure 8211 may be different from a stiffness of the second cantilever beam structure 8212 in order to make the first cantilever beam structure 8211 and the second cantilever beam structure 8212 generate different degrees of deformation in the vibration direction. Under the action of vibration signal from the vibration transmission assembly 823, a cantilever beam structure with low stiffness may generate a certain degree of deformation, and the deformation generated by a cantilever beam structure with a relatively high stiffness may be approximately considered to be null or less than the deformation generated by the cantilever beam structure with low stiffness. In some embodiments, when the microphone 800 is in operation, the cantilever beam structure with less stiffness (e.g., the second cantilever beam structure 8212) may deform in response to the vibration of the vibration transmission assembly 823, and a cantilever beam structure with relatively high stiffness (e.g., the first cantilever beam structure 8211) may vibrate with vibration transmission assembly 823 instead of deforming, which make the first distance d1 change.

In some embodiments, the resonance frequency of the cantilever beam structure with the low stiffness in an acoustoelectric conversion element 8210 may be within the frequency range within the hearing range of human ear. In some embodiments, the resonance frequency of the cantilever beam structure with a relatively high stiffness in the acoustoelectric conversion element 8210 may be within the frequency range insensitive to the human ear (e.g., greater than 16,000 Hz). In some embodiments, the stiffness of the first cantilever beam structure 8211 (or the second cantilever beam structure 8212) in the acoustoelectric conversion element 8210 may be implemented by adjusting the material, length, width, and thickness of the first cantilever beam structure 8211 (or the second cantilever beam structure 8212). In some embodiments, the parameters (e.g., material, thickness, length, width, etc.) of each set of cantilever beam structures corresponding to different acoustoelectric conversion elements 8210 may be adjusted to obtain different frequency responses corresponding to different resonance frequencies. In some embodiments, by adjusting the length of each set of cantilever beam structures (e.g., the first cantilever beam structure 8211 and the second cantilever beam structure 8212) corresponding to different acoustoelectric conversion elements 8210, at least two of a plurality of resonance frequencies corresponding to different acoustoelectric conversion elements 8210 may be within the range of 20 Hz-16000 Hz. In some embodiments, by adjusting the length of each set of cantilever beam structures (e.g., the first cantilever beam structure 8211 and the second cantilever beam structure 8212) corresponding to different acoustoelectric conversion elements 8210, the at least two of the plurality of resonance frequencies corresponding to different acoustoelectric conversion elements 8210 may be within the range of 100 Hz-1200 Hz. Since a set of cantilever beam structures corresponding to the acoustoelectric conversion element 8210 (e.g., the first cantilever beam structure 8211 and the second cantilever beam structure 8212) are sensitive to vibration near the resonance frequencies, it may be considered that the set of cantilever beam structures corresponding to the acoustoelectric conversion element 8210 have frequency selective characteristics for the vibration signal, i.e., the set of cantilever beam structures corresponding to the acoustoelectric conversion element 8210 may primarily convert the sub-band vibration signal near the resonance frequencies into the electrical signal. Therefore, in some embodiments, the plurality of cantilever beam structures corresponding to different acoustoelectric conversion elements 8210 may have different resonance frequencies by setting to different lengths, the sub-bands may be formed separately around each resonance frequency. In some embodiments, at least five sub-bands may be set within the frequency range of the human voice (e.g., 20 Hz-16000 Hz) through the plurality sets of cantilever beam structures. For example, 11 sub-bands may be set within the frequency range of the human voice through the plurality sets of cantilever beam structures, and the resonance frequency of each cantilever beam structure corresponding to the 11 sub-bands may be within the range of 500 Hz-700 Hz, 700 Hz-1000 Hz, 1000 Hz-1300 Hz, 1300 Hz-1700 Hz, 1700 Hz-2200 Hz, 2200 Hz-3000 Hz, 3000 Hz-3800 Hz, 3800 Hz-4700 Hz, 4700 Hz-5700 Hz, 5700 Hz-7000 Hz, 7000 Hz-12000 Hz respectively. As another example, 16 sub-bands may be set within the frequency range of the human voice through the plurality sets of cantilever beam structures, and the resonance frequency of each cantilever beam structure corresponding to the 16 sub-bands may be within the range of 500 Hz-640 Hz, 640 Hz-780 Hz, 780 Hz-930 Hz, 940 Hz-1100 Hz, 1100 Hz-1300 Hz, 1300 Hz-1500 Hz, 1500 Hz-1750 Hz, 1750 Hz-1900 Hz, 1900 Hz-2350 Hz, 2350 Hz-2700 Hz, 2700 Hz-3200 Hz, 3200 Hz-3800 Hz, 3800 Hz-4500 Hz, 4500 Hz-5500 Hz, 5500 Hz-6600 Hz, 6600 Hz-8000 Hz respectively. As further an example, 24 sub-bands may be set within the frequency range of the human voice through the plurality sets of cantilever beam structures, and the resonance frequency of each cantilever beam structure corresponding to the 24 sub-bands may be within the range of 20 Hz-120 Hz, 120 Hz-210 Hz, 210 Hz-320 Hz, 320 Hz-410 Hz, 410 Hz-500 Hz, 500 Hz-640 Hz, 640 Hz-780 Hz, 780 Hz-930 Hz, 940 Hz-1100 Hz, 1100 Hz-1300 Hz, 1300 Hz-1500 Hz, 1500 Hz-1750 Hz, 1750 Hz-1900 Hz, 1900 Hz-2350 Hz, 2350 Hz-2700 Hz, 2700 Hz-3200 Hz, 3200 Hz-3800 Hz, 3800 Hz-4500 Hz, 4500 Hz-5500 Hz, 5500 Hz-6600 Hz, 6600 Hz-7900 Hz, 7900 Hz-9600 Hz, 9600 Hz-12100 Hz, 12100 Hz-16000 Hz respectively. In some embodiments, 5-50 sub-bands may be formed within the frequency range of the human voice (e.g., 20 Hz-16,000 Hz) by adjusting the plurality sets of cantilever beam structures to different lengths. In some embodiments, 6-24 sub-bands may be within the frequency range of human voice (e.g., 20 Hz-16000 Hz) by adjusting the plurality sets of cantilever beam structures to different lengths.

Figure 9:
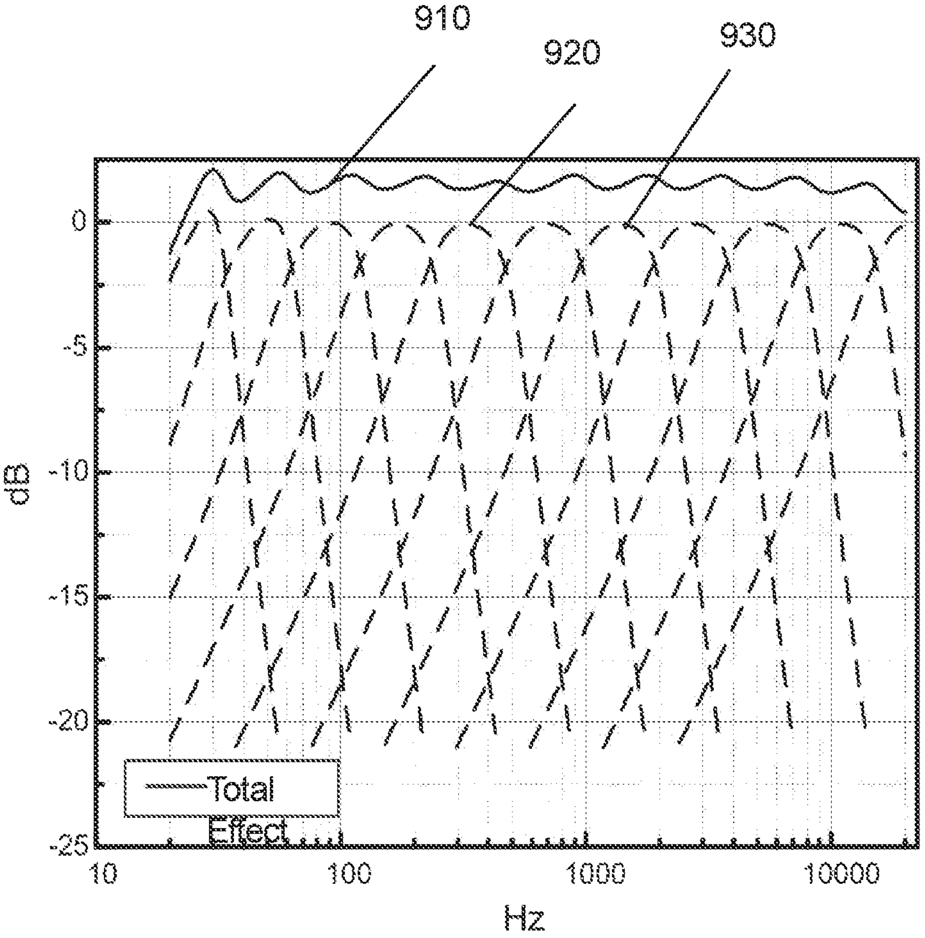
FIG. 9 is a schematic diagram of a frequency response curve of a microphone according to some embodiments of the present disclosure.

FIG. 9 is a frequency response curve schematic diagram of the microphone according to some embodiments of the present disclosure. As shown in FIG. 9, a horizontal axis may represent a frequency in Hz and the vertical axis may represent a frequency response of the sound signal output by the microphone in dB. The microphone may refer to the microphone 500, the microphone 800, a microphone 1000, a microphone 1100, a microphone 1300, a microphone 1400, a microphone 1500, a microphone 1800, a microphone 1900, and a microphone 2000, etc. The dashed lines in FIG. 9 may illustrate the frequency response curve corresponding to each acoustoelectric conversion element of the microphone, respectively. According to the frequency response curves in FIG. 9, each acoustoelectric conversion element has the resonance frequency (e.g., a resonance frequency of a frequency response curve 920 may be about 350 Hz and a resonance frequency of a frequency response curve 930 may be about 1500 Hz). When the external sound signal is transmitted to the microphone, different acoustoelectric conversion elements may be more sensitive to the vibration signal near the resonance frequencies, thus the signal output by each acoustoelectric conversion element may mainly include a sub-band signal corresponding to the resonance frequency. In some embodiments, the output at the resonance peak of each acoustoelectric conversion element may be much greater than the output of the flat area. The sub-band frequency division of the full band signal corresponding to the sound signal may be realized by selecting a frequency band near the resonance peak in the frequency response curve of each acoustoelectric conversion element. In some embodiments, each frequency response curve in FIG. 9 may be fused to obtain a flatter frequency response curve 910 with a high signal-to-noise ratio of the microphone. In addition, by setting different acoustoelectric conversion elements (e.g., the cantilever beam structure), the resonance peaks of different frequency ranges may be added to the microphone system, which may improve the sensitivity of the microphone near the plurality of resonance peaks and further improve the sensitivity of the microphone over the whole broadband.

By setting the plurality of acoustoelectric conversion elements in the microphone and using characteristic of the acoustoelectric conversion elements (e.g., the cantilever beam structure) having different resonance frequencies, filtering and frequency band decomposition of vibration signal may be achieved, which may avoid problems of complex hardware circuit design, relatively high computing resources of the software algorithms, signal distortion, and noise introduction, thus reducing the complexity and production cost of the microphone.

Figure 10:
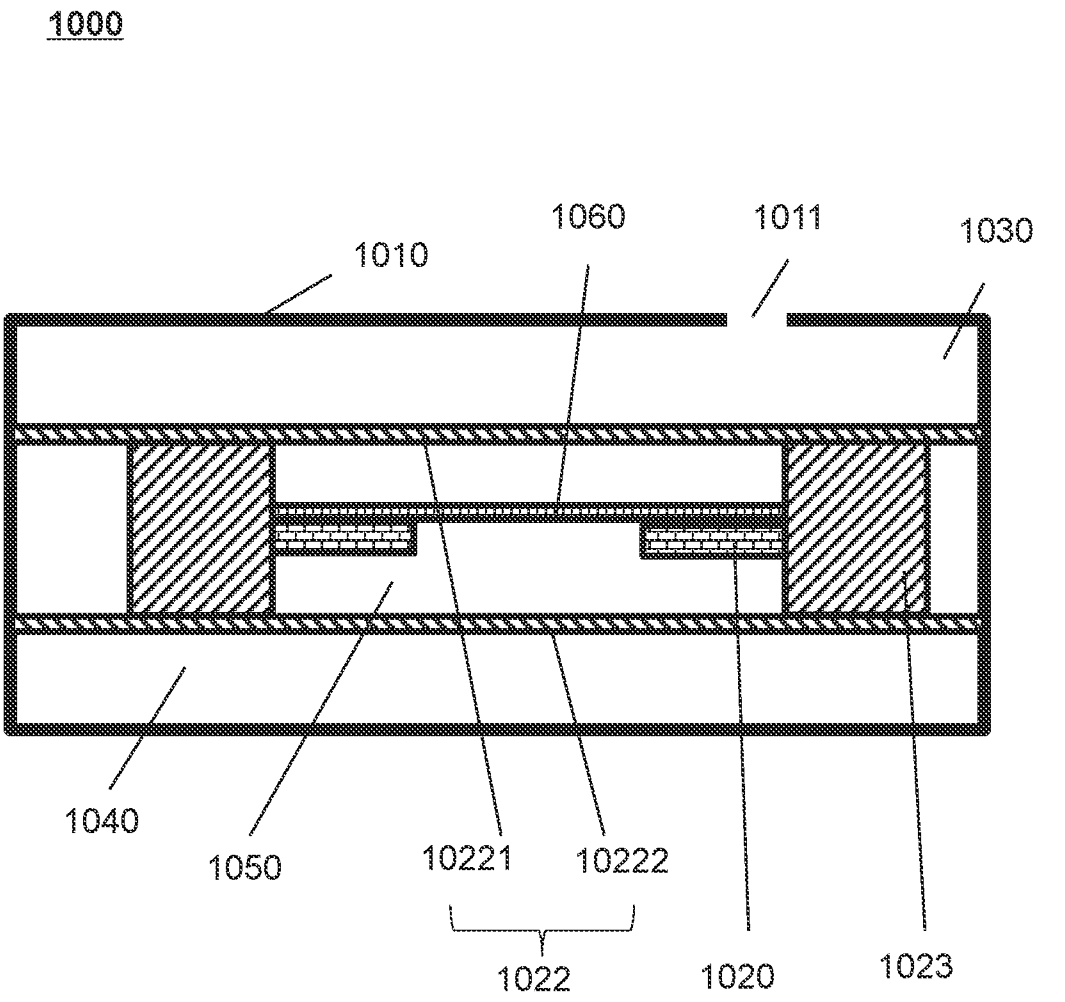
FIG. 10 is a schematic diagram illustrating a microphone according to some embodiments of the present disclosure.

FIG. 10 is a schematic diagram illustrating a microphone according to some embodiments of the present disclosure. As shown in FIG. 10, a microphone 1000 may include a shell structure 1010, an acoustoelectric conversion element 1020, and a vibration pickup assembly 1022. The microphone 1000 shown in FIG. 10 may be same or similar to the microphone 500 shown in FIG. 5. For example, the shell structure 1010 of the microphone 1000 may be same or similar to the shell structure 510 of the microphone 500. As another example, a first acoustic cavity 1030, a second acoustic cavity 1040, and a cavity 1050 of the microphone 1000 may be respectively the same as or similar to the first acoustic cavity 530, the second acoustic cavity 540, and the cavity 550 of the microphone 500. As further an example, the vibration pickup assembly 1022 (e.g., a first vibration pickup assembly 10221, a second vibration pickup assembly 10222) of the microphone 1000 may be same or similar to the vibration pickup assembly 522 (e.g., the first vibration pickup assembly 5221, the second vibration pickup assembly 5222) of the microphone 500. More structures of the microphone 1000 (e.g., a hole 1011, a vibration transmission assembly 1023, the acoustoelectric conversion element 1020, etc.) may be referred to FIG. 5 and related description.

In some embodiments, a main difference between the microphone 1000 shown in FIG. 10 and the microphone 500 shown in FIG. 5 may be that the microphone 1000 may further include one or more membrane structures 1060. In some embodiments, the membrane structure 1060 may be located on an upper and/or lower surface of the acoustoelectric conversion element 1020. For example, the membrane structure 1060 may be a monolayer membrane structure, which may be located on the upper or lower surface of the acoustoelectric conversion element 1020. As another example, the membrane structure 1060 may be a bilayer membrane, including a first membrane structure and a second membrane structure, wherein the first membrane structure may be located on the upper surface of the acoustoelectric conversion element 1020 and the second membrane structure may be located on the lower surface of the acoustoelectric conversion element 1020. A resonance frequency of the acoustoelectric conversion element 1020 may be adjusted by setting the membrane structure 1060 on the surface of the acoustoelectric conversion element 1020. In some embodiments, the resonance frequency of the acoustoelectric conversion element 1020 may be affected by adjusting the material, size (e.g., length, width), and thickness of the membrane structure 1060. On one hand, by adjusting parameters of the membrane structure 1060 (e.g., material, size, thickness, etc.) and the acoustoelectric conversion element 1020 (e.g., the cantilever beam structure), the acoustoelectric conversion element 1020 may generate resonance within a desired frequency range. On the other hand, the membrane structure 1060, provided on the surface of the acoustoelectric conversion element 1020, may prevent the microphone 1000 from damaging the acoustoelectric conversion element 1020 in case of overload, thus improving the reliability of microphone 1000. In addition, the membrane structure 1060, provided on the surface of acoustoelectric conversion element 1020, may reduce the amount of deformation of microphone 1000 due to stress and make the actual product closer to a design target.

In some embodiments, the membrane structure 1060 may fully or partially cover the upper surface and/or lower surface of the acoustoelectric conversion element 1020. For example, the upper surface or lower surface of each acoustoelectric conversion element 1020 may be covered with a corresponding membrane structure 1060, and the membrane structure 1060 may fully cover the upper surface or lower surface of the corresponding acoustoelectric element 1020, or the membrane structure 1060 may partially cover the upper or lower surface of the corresponding acoustoelectric element 1020. As another example, in the horizontal direction, when the plurality of acoustoelectric conversion elements 1020 are simultaneously located at the same horizontal plane, the membrane structure 1060 may fully cover the lower surfaces of the plurality of acoustoelectric conversion elements 1020 at a same horizontal plane simultaneously, for example, the membrane structure 1060 may be connected with an inner wall of the vibration transmission assembly 1023 through a peripheral side, thereby separating the cavity 1050 into two mutually independent cavities. As further an example, shape of the membrane structure 1060 may be the same as the cross-section shape of the vibration transmission assembly 1023, the membrane structure 1060 may be connected with the inner wall of the vibration transmission assembly 1023 through the peripheral side, and the middle part of the membrane structure 1060 may include a hole (not shown in FIG. 10), and the membrane structure 1060 may partially cover the upper or lower surfaces of the plurality of acoustoelectric conversion elements 1020 at a same horizontal plane, and the cavity 1050 may be divided into two connected cavities (the upper and lower) by the membrane structure 1060.

In some embodiments, the material of the membrane structure 1060 may include but is not limited to, one or more semiconductor material, metal material, metal alloy, organic material, etc. In some embodiments, the semiconductor material may include but is not limited to, silicon, silicon dioxide, silicon nitride, silicon carbide, etc. In some embodiments, the metallic material may include but are not limited to, copper, aluminum, chrome, titanium, gold, etc. In some embodiments, the metal alloy may include but are not limited to, copper-aluminum alloy, copper-gold alloy, titanium alloy, aluminum alloy, etc. In some embodiments, the organic material may include but is not limited to, polyimide, Parylene, PDMS, silicone gel, silica, etc.

Figure 11:
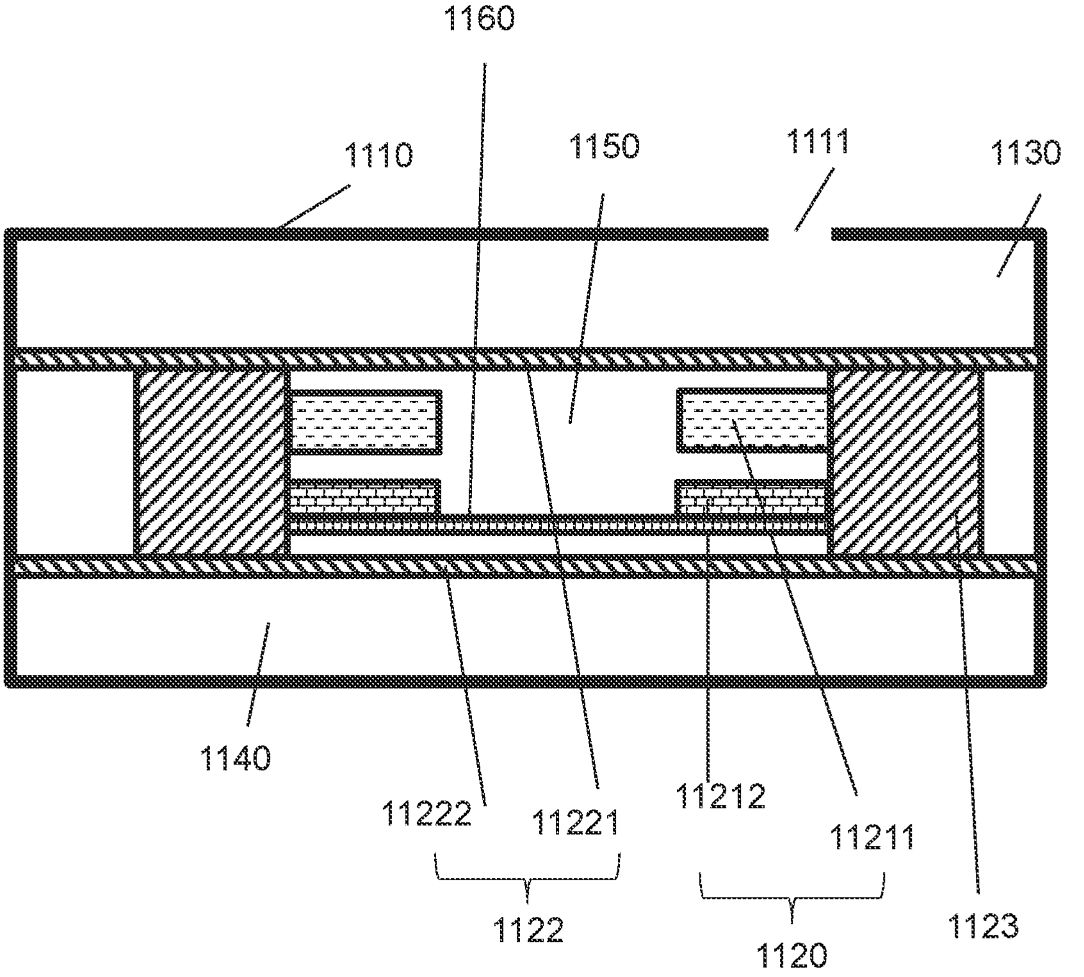
FIG. 11 is a schematic diagram illustrating a microphone according to some embodiments of the present disclosure.

FIG. 11 is a schematic diagram illustrating a microphone according to some embodiments of the present disclosure. A microphone 1100 shown in FIG. 11 may be same or similar to the microphone 800 shown in FIG. 8. For example, a shell structure 1110 of the microphone 1100 may be same or similar to the shell structure 810 of the microphone 800. As another example, a first acoustic cavity 1130, a second acoustic cavity 1140, and a cavity 1150 of the microphone 1100 may be same or similar to the first acoustic cavity 830, the second acoustic cavity 840, and the cavity 850 of the microphone 800, respectively. As further an example, the vibration pickup assembly 1122 (e.g., a first vibration pickup assembly 11221, a second vibration pickup assembly 11222) of the microphone 1100 may be same or similar to the vibration pickup assembly 822 (e.g., a first vibration pickup assembly 8221, a second vibration pickup assembly 8222) of the microphone 800. More structures about the microphone 1100 (e.g., a hole 1111, a vibration transmission assembly 1123, an acoustoelectric conversion element 1120, etc.) may be referred to FIG. 8 and related descriptions.

In some embodiments, a main difference between the microphone 1100 shown in FIG. 11 and the microphone 800 shown in FIG. 8 may be that the microphone 1100 may further include one or more membrane structures 1160. In some embodiments, a membrane structure 1160 may be located on the upper and/or lower surface of the cantilever beam structure (e.g., a second cantilever beam structure 11212) with a relatively low stiffness of the acoustoelectric conversion element 1120. For example, the membrane structure 1160 may be a monolayer membrane structure, which may be located on the upper or lower surface of the acoustoelectric conversion element 1020. As another example, the membrane structure 1160 may be a bilayer membrane structure, including a first membrane structure and a second membrane structure, wherein the first membrane structure may be located on an upper surface of the acoustoelectric conversion element 11212 and the second membrane structure may be located on a lower surface of the acoustoelectric conversion element 11212. In some embodiments, the membrane structure 1160 may fully or partially cover the upper surface and/or lower surface of the second cantilever beam structure 11212. For example, the upper surface or lower surface of each second cantilever beam structure 11212 may be covered with a corresponding membrane structure 1160, which may fully cover the upper surface or lower surface of the corresponding second cantilever beam structure 11212, or the membrane structure 1160 may partially cover the upper or lower surface of the corresponding second cantilever beam structure 11212. More information about the membrane structure 1160 fully or partially covering the upper surface and lower surface of the second cantilever beam structure 11212 may be referred to FIG. 10 and related descriptions.

In some embodiments, the membrane structure 1160 may further be located on the upper and/or lower surface of a cantilever beam structure (e.g., a first cantilever beam structure 11211) with relatively high stiffness of the acoustoelectric conversion element 1120. The manner of the membrane structure 1160 be located on the upper surface and/or lower surface of the first cantilever beam structure 11211 may be similar to the manner of the membrane structure 1160 located on the upper and/or lower surfaces of the second cantilever beam structure 11212, which may not be described herein.

Figure 12:
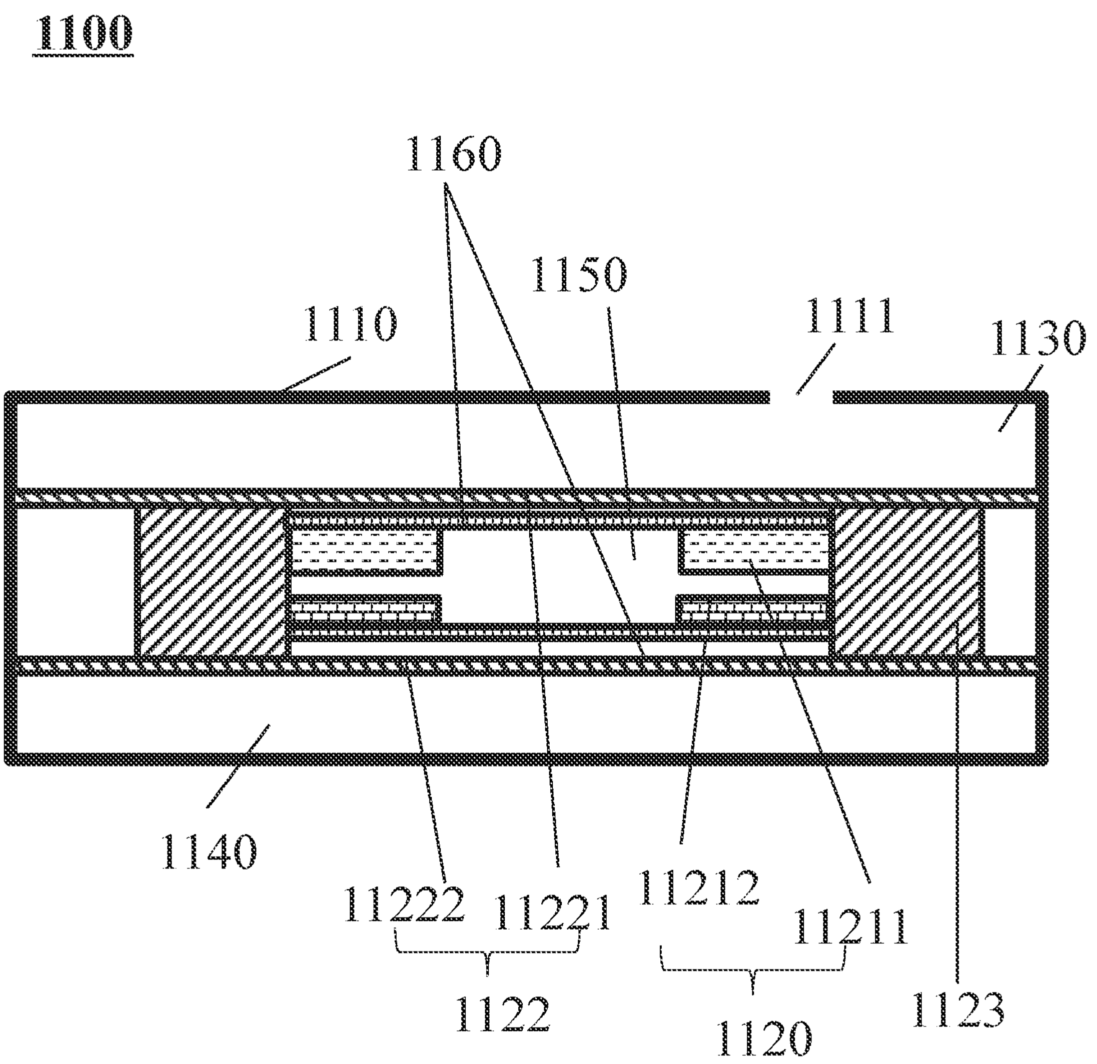
FIG. 12 is a schematic diagram illustrating a microphone according to some embodiments of the present disclosure.

In some embodiments, the membrane structure 1160 may further be simultaneously located on the upper surface and/or lower surface of a cantilever beam structure with low stiffness (e.g., the second cantilever beam structure 11212) and a cantilever beam structure with relatively high stiffness (e.g., the first cantilever beam structure 11211) of the acoustoelectric conversion element 1120. For example, FIG. 12 is a schematic diagram illustrating a microphone according to some embodiments of the present disclosure, as shown in FIG. 12, the membrane structure 1160 may be simultaneously located on an upper surface of the first cantilever beam structure 11211 and a lower surface of the second cantilever beam structure 11212. In some embodiments, by setting the membrane structure 1160 on the upper surface and/or lower surface of a cantilever beam structure with relatively high stiffness (e.g., the first cantilever beam structure 11211), the cantilever beam structure with relatively high stiffness may not deform relative to the vibration transmission assembly 1123, which may improve the sensitivity of the microphone 1100. On the other hand, the membrane structure 1060, provided on the surface of the second cantilever beam structure 1122 or the first cantilever beam structure 1120, may adjust the amount of deformation of the second cantilever beam structure 1122 or the first cantilever beam structure 1120 due to stress to precisely control a distance between the second cantilever beam structure 1122 and the first cantilever beam structure 1120.

Figure 13:
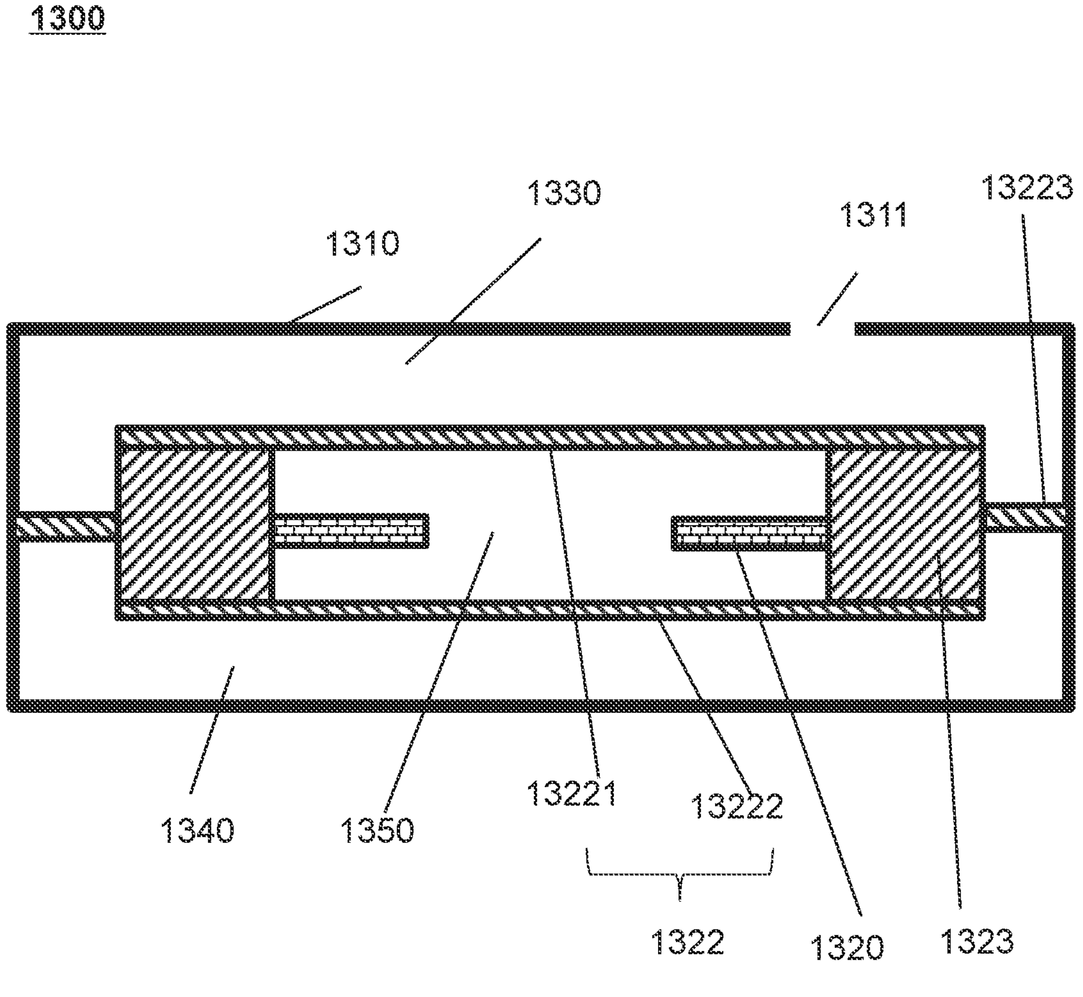
FIG. 13 is a schematic diagram illustrating a microphone according to some embodiments of the present disclosure.

FIG. 13 is a schematic diagram illustrating a microphone according to some embodiments of the present disclosure. As shown in FIG. 13, the microphone 1300 may include a shell structure 1310, the acoustoelectric conversion element 1320, and a vibration pickup assembly 1322. The microphone 1300 shown in FIG. 13 may be same or similar to the microphone 500 shown in FIG. 5. For example, the shell structure 1310 of the microphone 1300 may be same or similar to the shell structure 510 of the microphone 500. AS another example, a first acoustic cavity 1330, a second acoustic cavity 1340, and a cavity 1350 of the microphone 1300 may be same or similar to the first acoustic cavity 530, the second acoustic cavity 540, and the cavity 550 of the microphone 500, respectively. More information about the microphone 1300 (e.g., a hole 1311, a vibration transmission assembly 1323, the acoustoelectric conversion element 1320, etc.) may be referred to FIG. 5 and related descriptions.

In some embodiments, a main difference between the microphone 1300 shown in FIG. 13 and the microphone 500 shown in FIG. 5 may be a vibration pickup assembly 1322. In some embodiments, the vibration pickup assembly 1322 may include a first vibration pickup assembly 13221, a second vibration pickup assembly 13222, and a third vibration pickup assembly 13223. In some embodiments, the first vibration pickup assembly 13221, the vibration transmission assembly 1323, and the first vibration pickup assembly 13221 may be arranged sequentially from top to bottom, specifically, a lower surface of the first vibration pickup assembly 13221 may be connected with an upper surface of the vibration transmission assembly 1323, an upper surface of the second vibration pickup assembly 13222 may be connected with a lower surface of the vibration transmission assembly 1323, the first vibration pickup 13221, the second vibration pickup assembly 13222 and the vibration transmission assembly 1323 may define a cavity 1350, and the acoustoelectric conversion element 1320 may be located in the cavity 1350. In some embodiments, the third vibration pickup assembly 13223 may be connected between the vibration transmission assembly 1323 and the inner wall of the shell structure 1310. When the microphone 1300 works, the sound signal may enter the first acoustic cavity 1330 through a hole 1311 and act on the vibration pickup assembly 1322, which may cause the third vibration pickup assembly 13223 to vibrate, and the third vibration pickup assembly 13223 may transmit the vibration to the acoustoelectric conversion element 1320 through the vibration transmission assembly 1323.

In some embodiments, the third vibration pickup assembly 13223 may include one or more membrane structures that are adapted to the vibration transmission assembly 1323 and the shell structure 1310. For example, when both the shell structure 1310 and the vibration transmission assembly 1323 are cylindrical structures, the third vibration pickup assembly 13223 may be an annular membrane structure, an outer wall of peripheral side of the annular membrane structure may be connected with the shell structure 1310 and an inner wall of peripheral side of the annular membrane structure may be connected with the vibration transmission assembly 1323. As another example, if the shell structure 1310 is the cylindrical structure and the vibration transmission assembly 1323 is the cuboid structure, the third vibration pickup assembly 13223 may be a circular membrane structure with a rectangular hole in the center, the outer wall of the peripheral side of the membrane structure may be connected with the shell structure 1310 and the inner wall of the film structure may be connected with the vibration transmission assembly 1323. It should be noted that the shape of the third vibration pickup assembly 13223 may be not limited to the annular and rectangular shape mentioned above, but may further be other shapes of the membrane structure, for example, regular and/or irregular shapes such as pentagonal, hexagonal, etc. The shape and structure of the third vibration pickup assembly 13223 may be adapted to the shape of the shell structure 1310 and the vibration transmission assembly 1323.

In some embodiments, material of the third vibration pickup assembly 13223 may include but is not limited to, one or more semiconductor material, metal material, metal alloy, organic material, etc. In some embodiments, the semiconductor material may include but is not limited to, silicon, silicon dioxide, silicon nitride, silicon carbide, etc. In some embodiments, the metallic material may include but are not limited to, copper, aluminum, chrome, titanium, gold, etc. In some embodiments, the metal alloy may include but are not limited to, copper-aluminum alloy, copper-gold alloy, titanium alloy, aluminum alloy, etc. In some embodiments, the organic material may include but is not limited to, polyimide, Parylene, PDMS, silicone gel, silica, etc.

In some embodiments, the material of the first vibrating pickup assembly 13221 and/or the material of the second vibrating pickup assembly 13222 may be a flexible material. When the materials of the first vibrating pickup assembly 13221 and the second vibrating pickup assembly 13222 and the material of the third vibrating pickup assembly 13223 may be both flexible materials, the first vibration pickup assembly 13221 and the second vibration pickup assembly 13222, as part of the vibration pickup assembly 1322 (i.e., the first vibration pickup assembly 13221 and the second vibration pickup assembly 13222 may be used to pick up vibration signal), may deform under the action of air vibration in the first acoustic cavity 1330. In some embodiments, the material of the first vibration pickup assembly 13221 and the material of the second vibration pickup assembly 13222 may be a rigid material. In this case, the first vibration pickup portion 13221 and the second vibration pickup portion 13222 may not deform under the action of air vibrations in the first acoustic cavity 1330. In some embodiments, the first vibration pickup assembly 13221 and the second vibration pickup assembly 13222 is made of rigid material, which make the volume of the cavity 1350 remain basically constant during the working of the microphone 1300, which may avoid the influence of the volume change of the cavity 1350 on the acoustoelectric conversion element 1320, and ensure that the acoustoelectric conversion element 1320 generates resonance in a desired frequency range.

In some embodiments, the microphone 1300 may further include at least one membrane structure (not shown in the FIG. 13), and the at least one membrane structure may be located on an upper and/or lower surface of the acoustoelectric conversion element 1320. More information about detailed content of the at least one membrane structure may be related to FIG. 10 and related descriptions, which may not be described herein.

Figure 14:
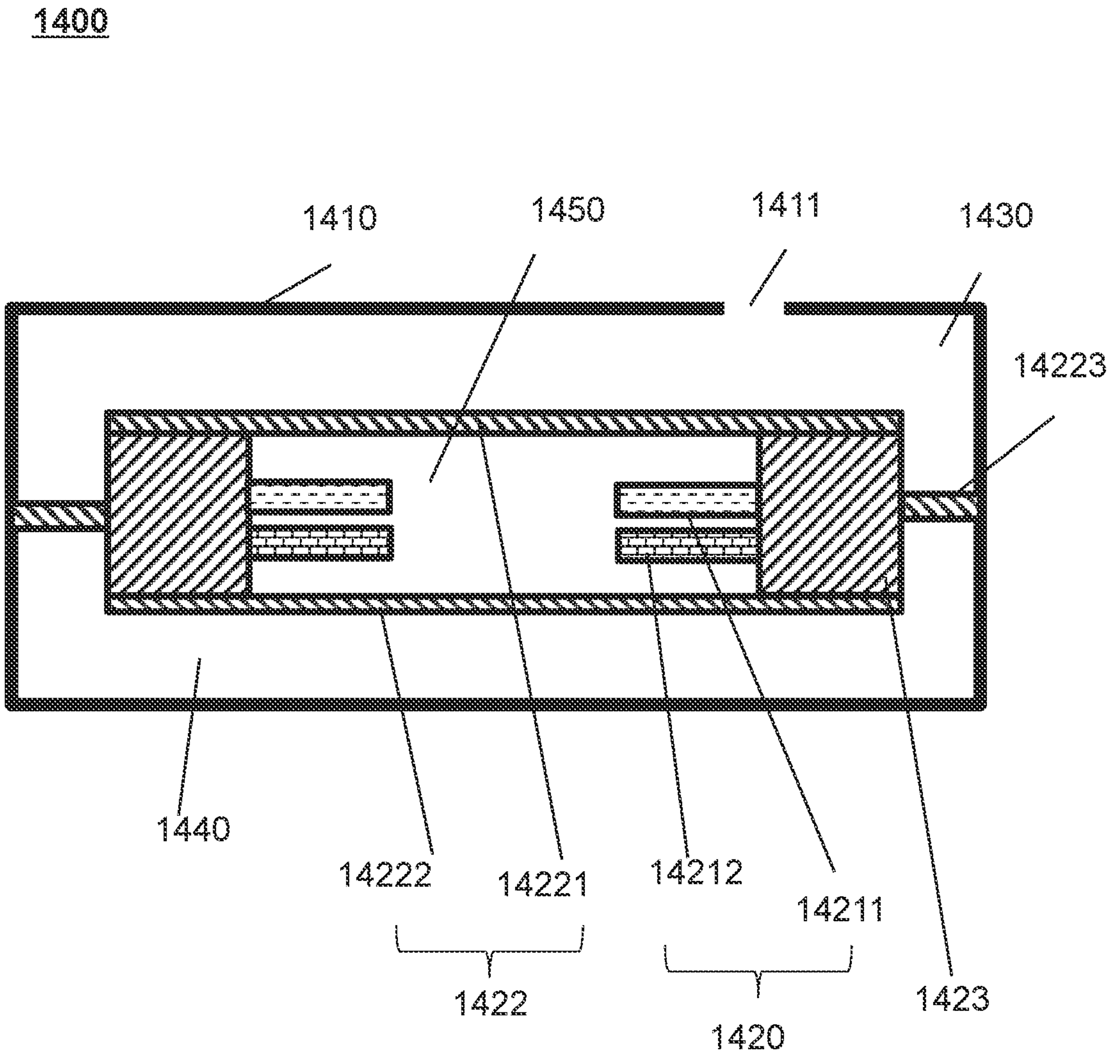
FIG. 14 is a schematic diagram illustrating a microphone according to some embodiments of the present disclosure.

FIG. 14 is a schematic diagram illustrating a microphone according to some embodiments of the present disclosure. As shown in FIG. 14, the microphone 1400 may include a shell structure 1410, an acoustoelectric conversion element 1420, and a vibration pickup assembly 1422. The microphone 1400 shown in FIG. 14 may be same or similar to the microphone 800 shown in FIG. 8. For example, the shell structure 1410 of the microphone 1400 may be same or similar to the shell structure 810 of the microphone 800. As another example, a first acoustic cavity 1430, a second acoustic cavity 1440, and a cavity 1450 of the microphone 1400 may be same or similar to the first acoustic cavity 830, the second acoustic cavity 840, and the cavity 850 of the microphone 800, respectively. More structures of the microphone 1400 (e.g., a hole 1411, a vibration transmission assembly 1423, the acoustoelectric conversion element 1420, etc.) may be referred to FIG. 8 and related descriptions.

In some embodiments, a main difference between the microphone 1400 shown in FIG. 14 and the microphone 800 shown in FIG. 8 may be the vibration pickup assembly 1422. In some embodiments, the vibration pickup assembly 1422 may include a first vibration pickup assembly 14221, a second vibration pickup assembly 14222, and a third vibration pickup assembly 14223. In some embodiments, the first vibration pickup assembly 14221, second vibration pickup 14222, and third vibration pickup 14223 may be arranged sequentially from top to bottom, specifically, a lower surface of the first vibration pickup 14221 may be connected with an upper surface of the vibration transmission assembly 1423, an upper surface of the second vibration pickup 14222 may be connected with a lower surface of the vibration transmission assembly 1423, the first vibration pickup 14221, the second vibration pickup assembly 14221, the second vibration pickup assembly 14222, and the vibration transmission assembly 1423 may define a cavity 1450, and the acoustoelectric conversion element 1420 is located in the cavity 1450. In some embodiments, the third vibration pickup assembly 14223 may be connected between the vibration transmission assembly 1423 and an inner wall of the shell structure 1410. When the microphone 1400 works, the sound signal may enter the first acoustic cavity 1430 through the hole 1411 and make the third vibration pickup assembly 14223 to vibrate, and the third vibration pickup assembly 14223 may transmit the vibration to the acoustoelectric conversion element 1420 through the vibration transmission assembly 1423. More information about the third vibration pickup assembly 14223 may be referred to FIG. 13 and related descriptions.

In some embodiments, the microphone 1400 may further include at least one membrane structure (not shown in the FIG. 14), and the at least one membrane structure may be located on an upper and/or lower surface of the acoustoelectric conversion element 1420. More information about detailed content of the at least one membrane structure may be related to FIG. 10-FIG. 12 and related descriptions, which may not be described herein.

Figure 15:
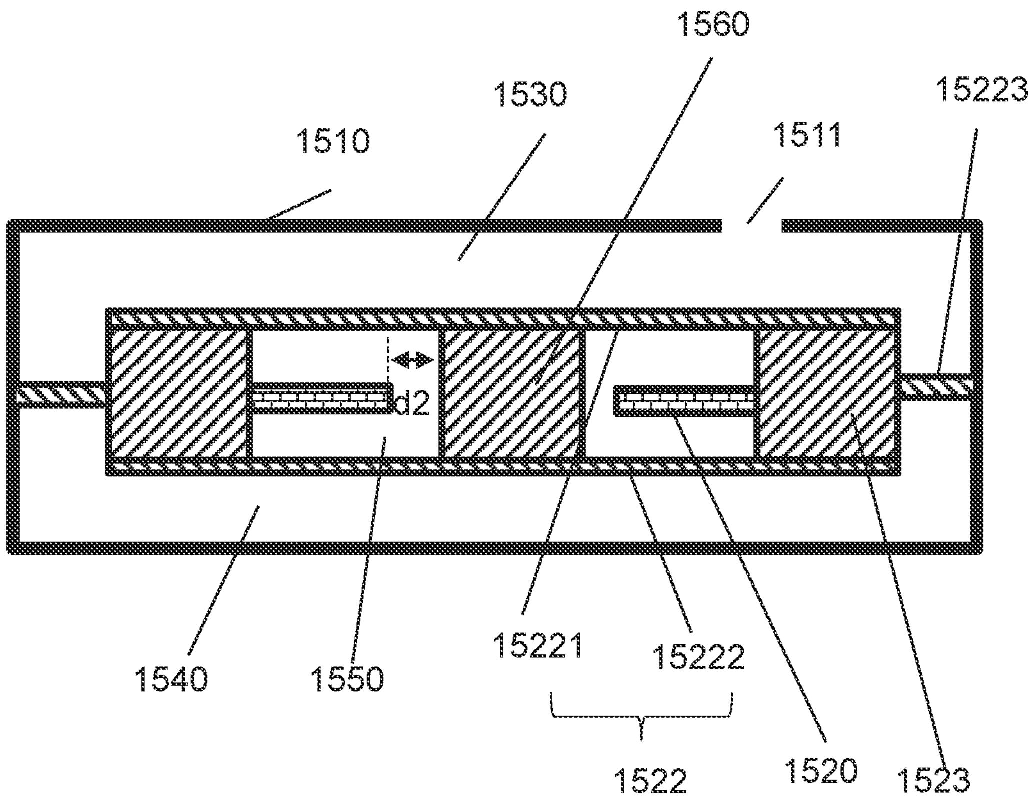
FIG. 15 is a schematic diagram illustrating a microphone according to some embodiments of the present disclosure.

FIG. 15 is a schematic diagram illustrating a microphone according to some embodiments of the present disclosure. As shown in FIG. 15, the microphone 1500 may include a shell structure 1510, an acoustoelectric conversion element 1520, and a vibration pickup assembly 1522. The microphone 1500 shown in FIG. 15 may be same or similar to the microphone 1300 shown in FIG. 13. For example, the shell structure 1510 of the microphone 1500 may be same or similar to the shell structure 1310 of the microphone 1300. As another example, a first acoustic cavity 1530, a second acoustic cavity 1540, and a cavity 1550 of the microphone 1500 may be same or similar to the first acoustic cavity 1330, the second acoustic cavity 1340, and the cavity 1350 of the microphone 1300, respectively. As further an example, the vibration pickup assembly 1522 (e.g., a first vibration pickup assembly 15221, a second vibration pickup assembly 15222, a third vibration pickup assembly 15223) of the microphone 1500 may be same or similar to the vibration pickup assembly 1322 (e.g., the first vibration pickup assembly 13221, the second vibration pickup assembly 13222, the third vibration pickup assembly 13223) of the microphone 1300. More structures of the microphone 1500 (e.g., a hole 1511, a vibration transmission assembly 1523, the acoustoelectric conversion element 1520, etc.) may be referred to FIG. 13 and related descriptions.

In some embodiments, a main difference between the microphone 1500 shown in FIG. 15 and the microphone 1300 shown in FIG. 13 may be that the microphone 1500 may further include one or more supporting structures 1560. In some embodiments, a supporting structure 1560 may be provided to the cavity 1550, an upper surface of the supporting structure 1560 may be connected with a lower surface of the first vibration pickup assembly 15221, and a lower surface of the supporting structure 1560 may be connected with an upper surface of the second vibration pickup assembly 15222. On one hand, by providing the supporting structure 1560 in the cavity, the supporting structure 1560 may be connected with the first vibration pickup assembly 15221 and the second vibration pickup assembly 15222, respectively, to further improve stiffness of the first vibration pickup assembly 15221 and the second vibration pickup assembly 15222, which may prevent the first vibration pickup assembly 15221 and the second vibration pickup assembly 15222 from being affected by the air vibration inside the first acoustic cavity 1530 to generate deformation, and reduce vibration modes of internal devices of the microphone 1500 (e.g., the first vibration pickup assembly 15221, the second vibration pickup assembly 15222). On the other hand, the supporting structure 1560 may be connected with the first vibration pickup assembly 15221 and the second vibration pickup assembly 15222, respectively, which may also improve the reliability of the microphone 1500 under an overload condition.

In some embodiments, the shape of the supporting structure 1560 may be a regular and/or irregular structure such as a platy structure, a cylinder, a frustum of a cone, a cuboid, a prismatic table, a hexahedron, etc. The material of the supporting structure 1560 may include but is not limited to, one or more semiconductor material, metal material, metal alloy, organic material, etc. In some embodiments, the semiconductor material may include but is not limited to, silicon, silicon dioxide, silicon nitride, silicon carbide, etc. In some embodiments, the metallic material may include but are not limited to, copper, aluminum, chrome, titanium, gold, etc. In some embodiments, the metal alloy may include but are not limited to, copper-aluminum alloy, copper-gold alloy, titanium alloy, aluminum alloy, etc. In some embodiments, the organic material may include but is not limited to, polyimide, Parylene, PDMS, silicone gel, silica, etc.

Figure 16A:
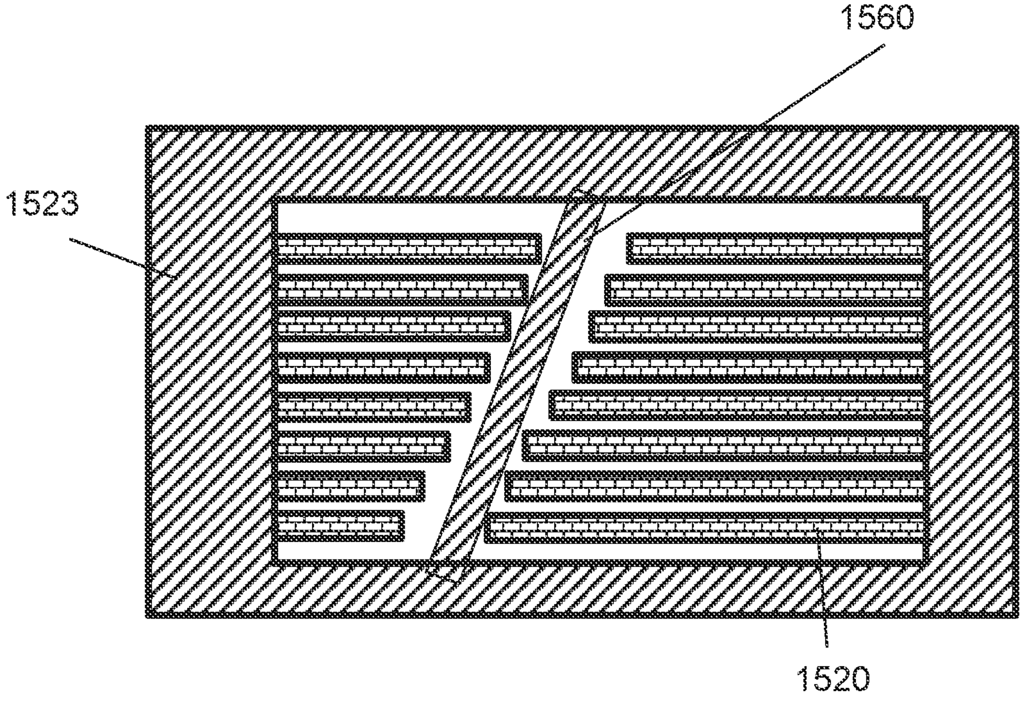
FIG. 16A is a sectional schematic diagram illustrating a microphone according to some embodiments of the present disclosure.
Figure 16B:
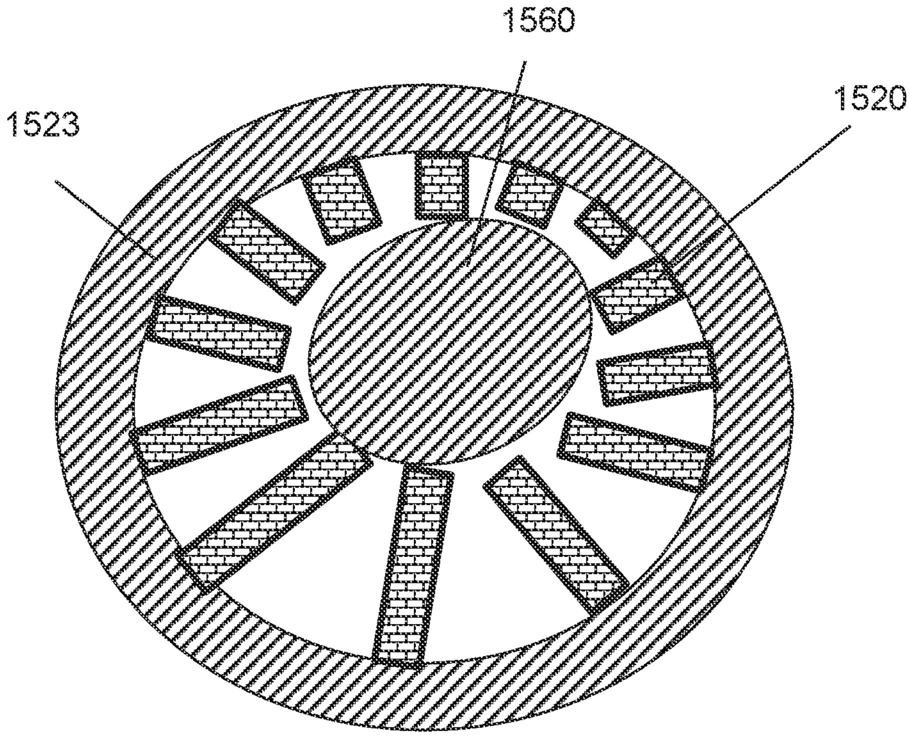
FIG. 16B is a sectional schematic diagram illustrating a microphone according to some embodiments of the present disclosure.
Figure 17A:
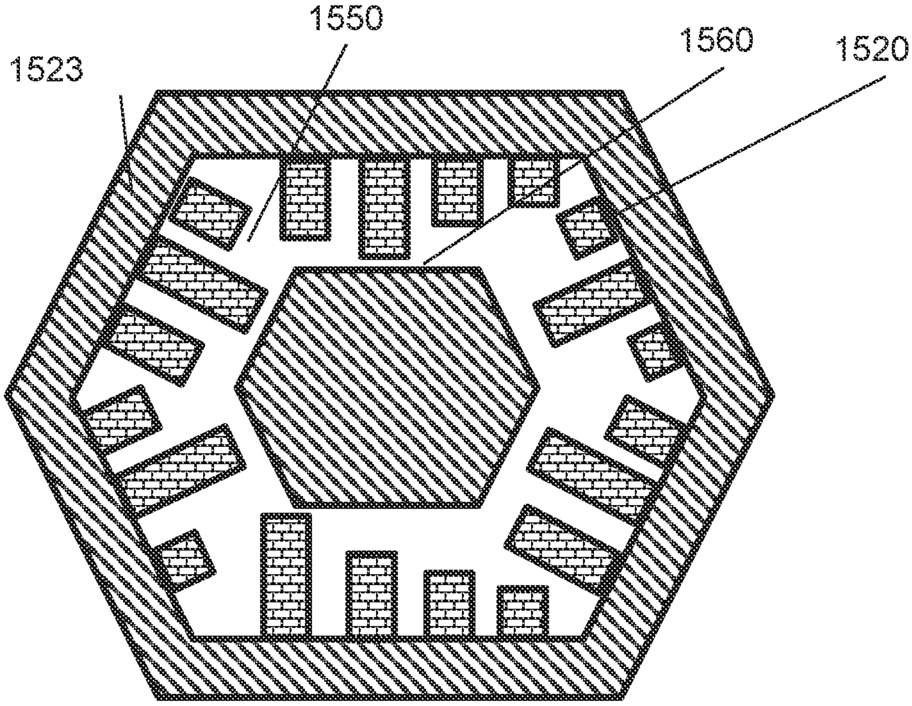
FIG. 17A is a sectional diagram illustrating a microphone according to some embodiments of the present disclosure.
Figure 17B:
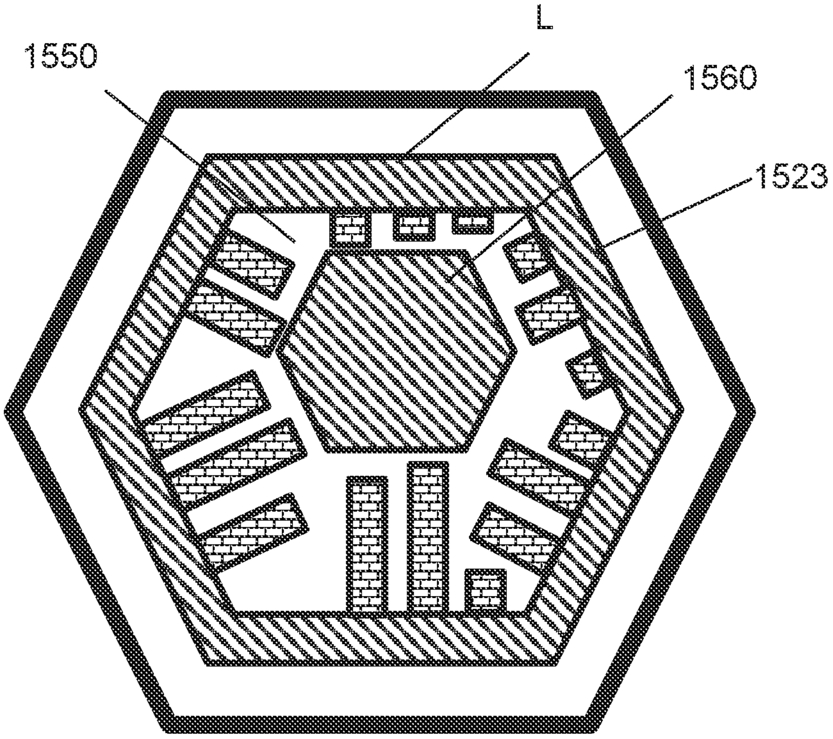
FIG. 17B is a sectional schematic diagram illustrating a microphone according to some embodiments of the present disclosure.

Referring to FIG. 15, in some embodiments, a second distance d2 between a free end of the acoustoelectric conversion element 1520 (i.e., an end suspended in the cavity 1550) and the supporting structure 1560 may be not less than 2 um to prevent the acoustoelectric conversion element 1520 from colliding with the supporting structure 1560 during the vibration. Meanwhile, when the second distance d2 is small (e.g., the second distance d2 may be not greater than 20 um), the overall volume of the microphone 1500 may be effectively reduced. In some embodiments, the free ends of different acoustoelectric conversion elements 1520 (e.g., the cantilever beam structures of different lengths) may have a different second distance d2 from the supporting structure 1560. In some embodiments, by designing different shapes and sizes of supporting structures 1560 and adjusting the position of the supporting structures 1560, the plurality of acoustoelectric conversion elements 1520 (e.g., the cantilever beam structures) may be closely arranged in the cavity 1550, and the microphone 1500 may have a smaller overall size. FIG. 16A and FIG. 16*b* are sectional schematic diagrams illustrating a microphone according to some embodiments of the present disclosure. As shown in FIGS. 16A and 16B, when the supporting structure 1560 is an elliptical cylinder, the supporting structure 1560, the vibration transmission assembly in the cavity 1550, and the vibration pickup assembly define an annular or annular-like cavity in which a plurality of acoustoelectric conversion elements 1520 may be located and spaced along the peripheral side of the supporting structure 1560. In some embodiments, the supporting structure 1560 may be located in the center of the cavity 1550. For example, FIG. 17A is a sectional schematic diagram illustrating a microphone according to some embodiments of the present disclosure, as shown in FIG. 17A, the supporting structure 1560 may be located in a center of the cavity 1550. The center may be a geometric center of the cavity 1550. In some embodiments, the supporting structure 1560 may also be set in the cavity 1550 near each end of the vibration transmission assembly 1523. For example, FIG. 17B is a sectional schematic diagram illustrating a microphone according to some embodiments of the present disclosure, as shown in FIG. 17B, the supporting structure 1560 may be located in the cavity 1550 near a side wall L of the vibration transmission assembly 1523. It should be noted that the shape, arrangement, position, and material of the supporting structure 1550 may be adapted according to the length, number, and distribution of the acoustoelectric conversion element 1520, etc., and which may not be further limited here.

In some embodiments, the microphone 1500 may further include at least one membrane structure (not shown in the FIG. 15), and the at least one membrane structure may be located on the upper and/or lower surface of the acoustoelectric conversion element 1520. In some embodiments, a center of the membrane structure may be provided with a hole for the supporting structure 1560 to pass through, which may be same as or different from the cross-sectional shape of the supporting structure. In some embodiments, a peripheral side of the supporting structure 1560 may be connected with a peripheral side of a central hole of the membrane structure, or the peripheral side of the supporting structure 1560 may be not connected with the peripheral side of the central hole of the membrane structure. More information about the shape, material and structure of the membrane structure may be related to FIG. 10 and related descriptions.

It should be noted that the supporting structure may further be applied to other embodiments of the microphones. For example, the supporting structure may be applied to the microphone 500 shown in FIG. 5, the microphone 800 shown in FIG. 8, the microphone 1000 shown in FIG. 10, the microphone 1100 shown in FIG. 11, and the microphone 1200 shown in FIG. 12. When the supporting structure is applied to other microphones, the shape, position and material of the supporting structure may be adapted to the specific situation.

Figure 18:
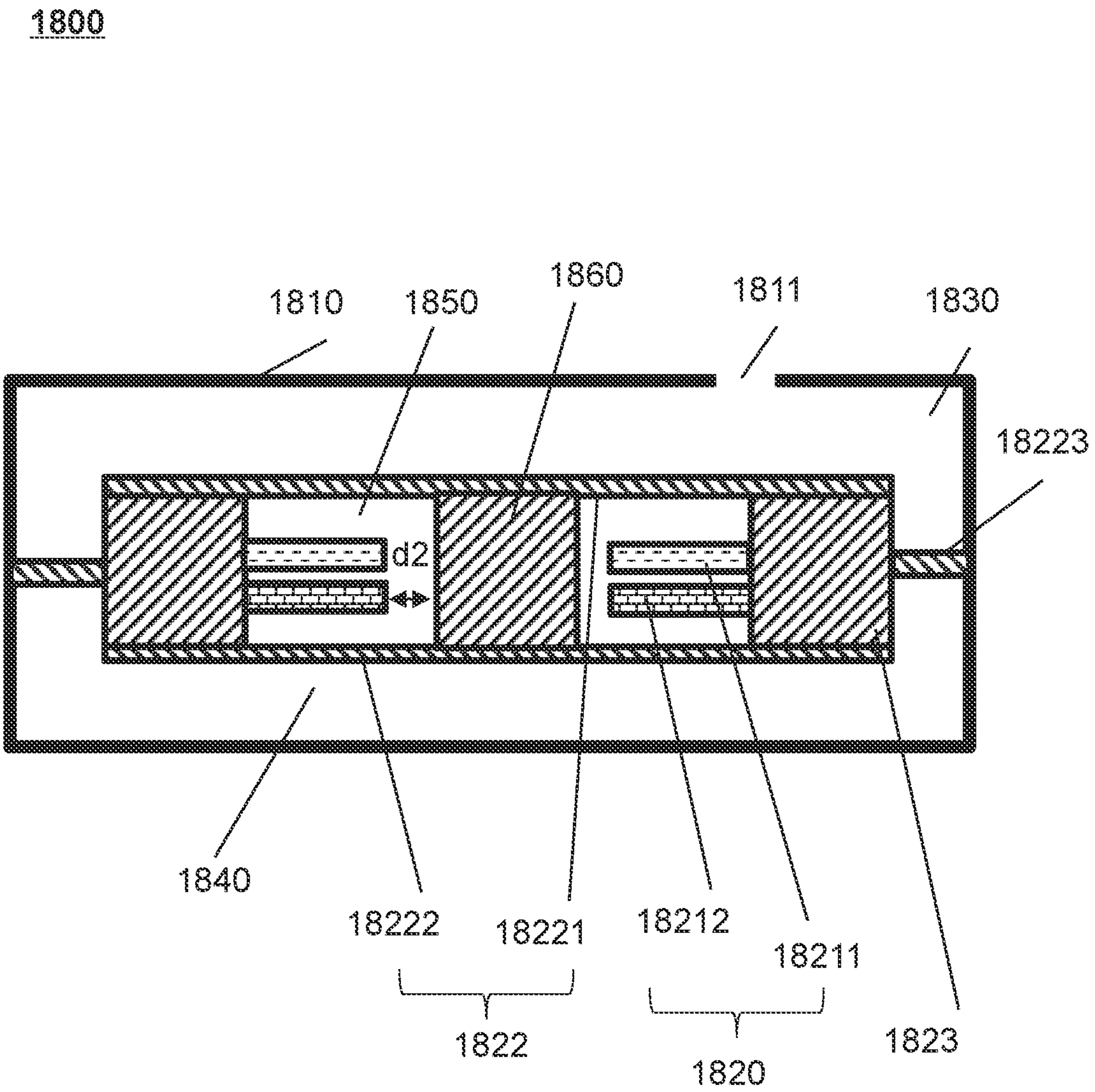
FIG. 18 is a schematic diagram illustrating a microphone according to some embodiments of the present disclosure.

FIG. 18 is a schematic diagram illustrating a microphone according to some embodiments of the present disclosure. As shown in FIG. 18, the microphone 1800 may include a shell structure 1810, an acoustoelectric conversion element 1820, and a vibration pickup assembly 1822. The microphone 1800 shown in FIG. 18 may be same or similar to the microphone 1400 shown in FIG. 14. For example, the shell structure 1810 of the microphone 1800 may be same or similar to the shell structure 1410 of the microphone 1400. As another example, a first acoustic cavity 1830, a second acoustic cavity 1840, and a cavity 1850 of the microphone 1800 may be same or similar to the first acoustic cavity 1430, the second acoustic cavity 1440, and the cavity 1450 of the microphone 1400, respectively. As further an example, the vibration pickup assembly 1822 (e.g., a first vibration pickup assembly 18221, a second vibration pickup assembly 18222, a third vibration pickup assembly 18223) of the microphone 1800 may be same or similar to the vibration pickup assembly 1422 (e.g., the first vibration pickup assembly 14221, the second vibration pickup assembly 14222, the third vibration pickup assembly 14223) of the microphone 1300. More structures of the microphone 1800 (e.g., a hole 1811, a vibration transmission assembly 1823, the acoustoelectric conversion element 1820, etc.) may be referred to FIG. 14 and related descriptions.

In some embodiments, a main difference between the microphone 1800 shown in FIG. 18 and the microphone 1400 shown in FIG. 14 may be that the microphone 1800 may further include a supporting structure 1860. In some embodiments, an upper surface of the supporting structure 1860 may be connected with a lower surface of the first vibratory pickup assembly 18221 and a lower surface of the supporting structure 1860 may be connected with an upper surface of the second vibratory pickup assembly 18222. In some embodiments, free ends of the at least two of the acoustoelectric conversion elements 1820 (i.e., the ends suspended in the cavity 1850) may have a second distance d2 from the supporting structure 1860. More information of the supporting structure 1860 may be related to FIG. 15 and related descriptions.

In some embodiments, the microphone 1800 may further include at least one membrane structure (not shown in FIG. 18). More information about the at least membrane structure of the microphone 1800 including the supporting structure 1860 may related to FIG. 11, FIG. 12, FIG. 15 and related descriptions.

It should be noted that the supporting structure in the embodiment may be not limited to the microphones shown in FIG. 15 and FIG. 18, the supporting structure may be applied to the microphones described in other embodiments, such as the microphones shown in FIG. 5, FIG. 8, FIG. 10, FIG. 11, FIG. 12, etc., and which may not be limited herein.

Figure 19:
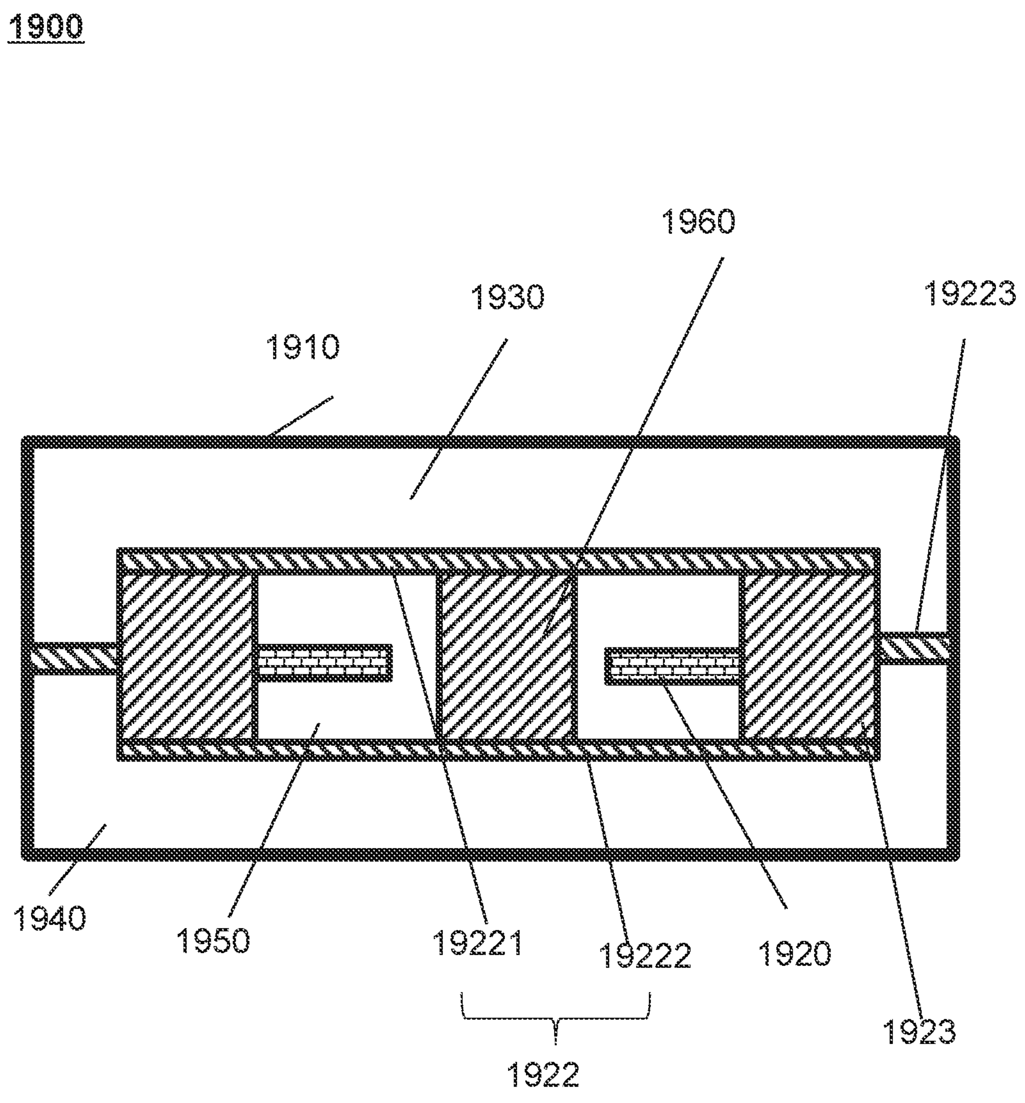
FIG. 19 is a schematic diagram illustrating a microphone according to some embodiments of the present disclosure.

FIG. 19 is a schematic diagram illustrating a microphone according to some embodiments of the present disclosure. In some embodiments, the microphone may be a bone conduction microphone, as shown in FIG. 19, a bone conduction microphone 1900 may include a shell structure 1910, an acoustoelectric conversion element 1920, and a vibration pickup assembly 1922. The elements of the bone conduction microphone 1900 shown in FIG. 19 may be same or similar to the elements of the microphone 1500 shown in FIG. 15, such as the acoustoelectric conversion element 1920, the first acoustic cavity 1930, the second acoustic cavity 1940, a cavity 1950, a vibration transmission assembly 1923, the supporting structure 1960, or the like.

In some embodiments, a main difference between the bone conduction microphone 1900 and the microphone 1500 shown in FIG. 15 may be a different manner of picking up the vibration. The vibration pickup assembly 1522 of the microphone 1500 may pick up the air vibration signal transmitted to the first acoustic cavity 1530 through the hole 1511, in contrast, the shell structure 1910 of the bone conduction microphone 1900 may not include a hole, and the bone conduction microphone 1900 may generate a vibration signal through the vibration pickup assembly 1922 in response to the vibration of the shell structure 1910. Specifically, the shell structure 1910 may generate vibration based on the external sound signal, the third vibration pickup assembly 19223 may generate vibration signal in response to the vibration of the shell structure 1910, and transmit the vibration signal through the vibration transmission assembly 1923 to the acoustoelectric conversion element 1920, which may convert the vibration signal into the electrical signal to output.

Figure 20:
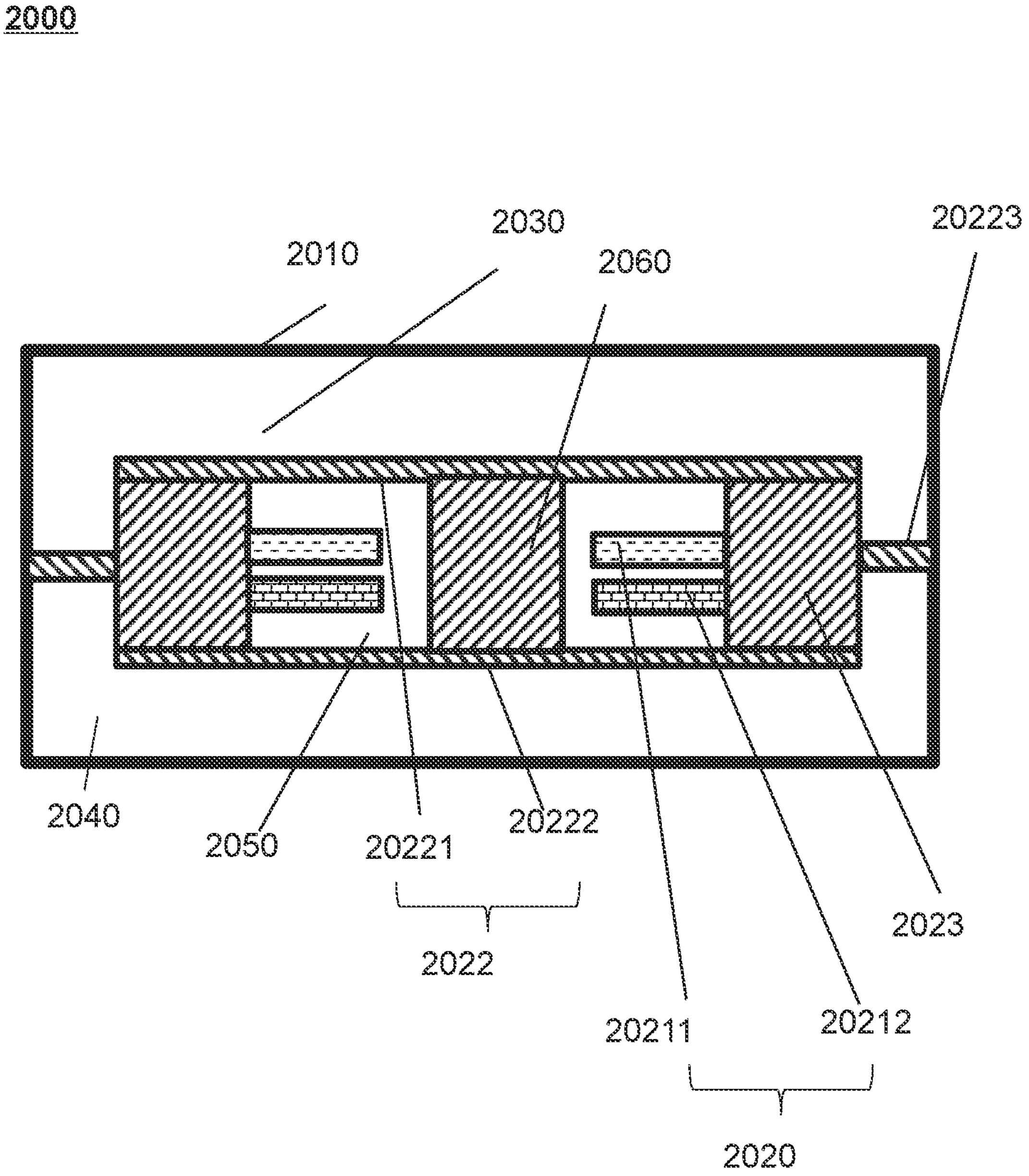
FIG. 20 is a schematic diagram illustrating a microphone according to some embodiments of the present disclosure.

FIG. 20 is a schematic diagram illustrating a microphone according to some embodiments of the present disclosure. As shown in FIG. 20, a bone conduction microphone 2000 may include a shell structure 2010, an acoustoelectric conversion element 2020, and a vibration pickup assembly 2022. The components of the bone conduction microphone 2000 shown in FIG. 20 may be same or similar to the components of the microphone 1800 shown in FIG. 18, such as the acoustoelectric conversion element 2020, a first acoustic cavity 2030, a second acoustic cavity 2040, a cavity 2050, a vibration transmission assembly 2023, a supporting structure 2060, or the like.

In some embodiments, a main difference between the bone conduction microphone 2000 and the microphone 1800 shown in FIG. 18 may be a different manner of picking up the vibration. The vibration pickup assembly 1822 (e.g., the first vibration pickup assembly 18221, the second vibration pickup assembly 18222, the third vibration pickup assembly 18223) of the microphone 1800 may pick up the air vibration signal transmitted to the first acoustic cavity 1830 through the hole 1811, in contrast, the shell structure 2010 of the bone conduction microphone 2000 may not include a hole, and the bone conduction microphone 1900 generates a vibration signal through the vibration pickup assembly 2022 (e.g., a third vibration pickup assembly 20223) in response to the vibration of the shell structure 2010. In some embodiments, the shell structure 2010 may generate vibration based on the external sound signal, the third vibration pickup assembly 20223 may generate a vibration signal in response to the vibration of the shell structure 2010 and transmit the vibration signal through the vibration transmission assembly 2023 to the acoustoelectric conversion element 2020, which may convert the vibration signal into the electrical signal to output.

It should be noted that the microphone 500 shown in FIG. 5, the microphone 800 shown in FIG. 8, the microphone 1000 shown in FIG. 10, the microphone 1100 shown in FIG. 11, and the microphone 1200 shown in FIG. 12 may further be used as a bone conduction microphone, for example, the microphone may be arranged without a hole, the shell structure may generate vibration based on the external sound signal, the first vibration pickup assembly or the second vibration pickup assembly may generate a vibration signal in response to the vibration of the shell structure, and transmit the vibration to the acoustoelectric conversion element through the vibration transmission assembly, and the acoustoelectric conversion element may convert the vibration signal into an electric signal and outputs.

The basic concepts have been described. Obviously, for those skilled in the art, the detailed disclosure may be only an example and may not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by software (including firmware, resident software, microcode, etc.), or may be performed by a combination of hardware and software. The above hardware or software may be referred to as "data block", "module", "engine", "unit", "component". or "system". In addition, aspects of the present disclosure may appear as a computer product located in one or more computer-readable media, the product including computer-readable program code.

A computer storage medium may include a propagation data signal containing a computer program encoding, such as on a baseband or as part of a carrier. The propagation signal may have a variety of expressions, including an electromagnetic form, an optical form, or a suitable combination form. The computer storage medium may be any computer-readable medium other than the computer-readable storage medium, which may be used to perform system, devices, or devices to implement communication, propagating, or devices by connecting to an instruction. The program code located on the computer storage medium may be propagated through any suitable medium, including radio, cable, fiber optic cable, RF, or similar media, or any combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter case, the remote computer may be connected to the user's computer through any network, such as a local area network (LAN) or a wide area network (WAN), or connected to an external computer (e.g., via the Internet), or in a cloud computing environment, or as a service use such as software as a service (SaaS).

Moreover, unless otherwise specified in the claims, the sequence of the processing elements and sequences of the present application, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure may not mean that the present disclosure object requires more features than the features mentioned in the claims. In fact, the features of the embodiments are less than all of the features of the individual embodiments disclosed above.

In some embodiments, the numbers expressing quantities, properties, and so forth, used to describe and claim certain embodiments of the application are to be understood as being modified in some instances by the term "about," "approximate," or "substantially." Unless otherwise stated, "about," "approximate," or "substantially" may indicate a ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present application are used to confirm the range of ranges, the settings of this type are as accurate in the feasible range in the feasible range in the specific embodiments.

Each patent, patent application, patent application publication, and other materials cited herein, such as articles, books, instructions, publications, documents, etc., are hereby incorporated by reference in the entirety. In addition to the application history documents that are inconsistent or conflicting with the contents of the present disclosure, the documents that may limit the widest range of the claim of the present disclosure (currently or later attached to this application) are excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the disclosure are used only to illustrate the principles of the embodiments of this application. Other modifications may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A microphone, comprising:

a shell structure;

a vibration pickup assembly, wherein the vibration pickup assembly is accommodated in the shell structure and generates vibration in response to an external sound signal transmitted to the shell structure; and at least two acoustoelectric conversion elements configured to respectively receive the vibration of the vibration pickup assembly to generate an electrical signal, wherein, the at least two acoustoelectric conversion elements have different frequency responses to the vibration of the vibration pickup assembly.

2. The microphone of claim 1, wherein a frequency response corresponding to each acoustoelectric conversion element includes at least one resonant frequency, at least two of a plurality of resonant frequencies corresponding to the at least two acoustoelectric conversion elements are within a range of 20 Hz-16000 Hz.

3. The microphone of claim 1, wherein a count of sub-bands corresponding to the at least two acoustoelectric conversion elements are no less than 5.

4. The microphone of claim 1, wherein the vibration pickup assembly and the shell structure define at least one acoustic cavity, the at least one acoustic cavity includes a first acoustic cavity;

the shell structure includes at least one hole, the at least one hole is located at the first acoustic cavity, and the at least one hole guides the external sound signal into the first acoustic cavity, wherein the vibration pickup assembly vibrates in response to a sound signal in the first acoustic cavity, and the at least two acoustoelectric conversion elements respectively receive the vibration of the vibration pickup assembly to generate the electrical signal.

5. The microphone of claim 1, wherein the vibration pickup assembly is connected with the shell structure through a peripheral side of the vibration pickup assembly, wherein at least partial structure of the vibration pickup assembly generates vibration in response to the external sound signal.

6. The microphone of claim 5, wherein the vibration pickup assembly includes a first vibration pickup assembly, and the at least two acoustoelectric conversion elements are connected with the first vibration pickup assembly directly or indirectly.

7. The microphone of claim 5, wherein the vibration pickup assembly includes a first vibration pickup assembly and a second vibration pickup assembly sequentially arranged from top to bottom, and the first vibration pickup assembly and the second vibration are connected with the shell structure through a peripheral side, the first vibration pickup assembly, the second vibration, and the shell structure defines a cavity, wherein at least partial structure of the first vibration pickup assembly and the second vibration pickup assembly generate vibration in responses to the external sound signal.

8. The microphone of claim 7, wherein a vibration transmission assembly in a tubular structure is arranged between the first vibration pickup assembly and the second vibration pickup assembly, wherein the vibration transmission assembly, the first vibration pickup assembly, and the second vibration pickup assembly defines a cavity.

9. The microphone of claim 7, wherein each acoustoelectric conversion element includes a cantilever beam structure, one end of the cantilever beam structure is connected with an inner wall of the vibration transmission assembly and another end of the cantilever beam structure is suspended in the cavity, wherein the cantilever beam structure is deformed based on a vibration signal to convert the vibration signal into an electrical signal.

10. The microphone of claim 9, wherein different cantilever beam structures are distributed at intervals at the inner wall of the vibration transmission assembly.

11. The microphone of claim 9, wherein a size or material of the cantilever beam structure corresponding to each of the at least two acoustoelectric conversion elements is different.

12. The microphone of claim 11, wherein the at least two acoustoelectric conversion elements include a first cantilever beam structure and a second cantilever beam structure, a length of the first cantilever beam in a direction perpendicular to a vibration direction of the first cantilever beam is greater than a length of the second cantilever beam in a direction perpendicular to a vibration direction of the second cantilever beam, and a resonant frequency corresponding to the first cantilever beam is lower than a resonant frequency corresponding to the second cantilever beam.

13. The microphone of claim 9, wherein the cantilever beam structure includes a first electrode layer, a piezoelectric layer, a second electrode layer, an elastic layer, and a substrate layer, wherein the first electrode layer, the piezoelectric layer, and the second electrode layer are sequentially arranged, the elastic layer is located on an upper surface of the first electrode layer or a lower surface of the second electrode layer, and the substrate layer is located on an upper surface or lower surface of the elastic layer.

14. The microphone of claim 9, wherein the cantilever beam structure includes at least one elastic layer, an electrode layer, and a piezoelectric layer, wherein the at least one elastic layer is located on a surface of the electrode layer; the electrode layer includes a first electrode and a second electrode, wherein the first electrode is bent into a first comb-like structure, the second electrode is bent into a second comb-like structure, the first comb-like structure cooperates with the second comb-like structure to form the electrode layer located on an upper surface or a lower surface of the piezoelectric layer; the first comb-like structure and the second comb-like structure extend along a length of the cantilever beam structure.

15. The microphone of claim 7, wherein each acoustoelectric conversion element includes a first cantilever beam structure and a second cantilever beam structure, the first cantilever beam structure is arranged opposite to the second cantilever beam structure, and the first cantilever beam structure and the second cantilever beam structure have a first distance, wherein the first distance between the first cantilever beam structure and the second cantilever beam structure changes based on a vibration signal to convert the vibration signal into an electrical signal.

16. The microphone of claim 15, wherein the first cantilever beam structure and the second cantilever beam structure corresponding to each acoustoelectric conversion element are distributed at intervals at an inner wall of a peripheral side of the vibration transmission assembly.

17. The microphone of claim 5, wherein the vibration pickup assembly includes a first vibration pickup assembly, a second vibration pickup assembly, and a third vibration pickup assembly, the first vibration pickup assembly and the second vibration pickup assembly are set opposite to each other, a vibration transmission assembly in a tubular structure is arranged between the first vibration assembly pickup assembly and the second vibration pickup assembly, the vibration transmission assembly, the first vibration pickup assembly, and the second vibration pickup assembly defines a cavity;

the third vibration pickup assembly is connected between the vibration transmission assembly and an inner wall of the shell structure, wherein the third vibration pickup assembly generates vibration in response to the external sound signal.

18. The microphone of claim 1, wherein the microphone includes at least one membrane structure, wherein the at least one membrane structure is located on an upper surface and/or a lower surface of the acoustoelectric conversion elements.

19. The microphone of claim 1, wherein the microphone includes at least one supporting structure, one end of the at least one supporting structure is connected with a first vibration pickup assembly of the vibration pickup assembly, and another end of the at least one supporting structure is connected with a second vibration pickup assembly of the vibration pickup assembly, and a free end of the at least two acoustoelectric conversion elements and the supporting structure have a second distance.

20. The microphone of claim 1, wherein the microphone further includes at least one sampling module configured to convert electrical signals output by different acoustoelectric conversion elements into digital signals, wherein the sampling module uses different sampling frequencies to sample the electrical signals output by different acoustoelectric conversion elements.

* * * * *